United States Patent
Nassar et al.

(10) Patent No.: US 10,148,666 B2
(45) Date of Patent: *Dec. 4, 2018

(54) UNIFIED ONLINE CONTENT MANAGER APPARATUSES, METHODS, AND SYSTEMS

(71) Applicant: VISA INTERNATIONAL SERVICE ASSOCIATION, San Francisco, CA (US)

(72) Inventors: Richard S. Nassar, San Mateo, CA (US); Richard John McCarthy, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/378,954

(22) Filed: Dec. 14, 2016

(65) Prior Publication Data

US 2017/0126695 A1    May 4, 2017

Related U.S. Application Data

(63) Continuation of application No. 13/304,343, filed on Nov. 24, 2011, now Pat. No. 9,552,431.
(Continued)

(51) Int. Cl.
*H04L 29/06* (2006.01)
*G06F 17/30* (2006.01)
(Continued)

(52) U.S. Cl.
CPC .......... *H04L 63/105* (2013.01); *G06F 17/301* (2013.01); *G06F 17/30867* (2013.01);
(Continued)

(58) Field of Classification Search
CPC ............... G06F 21/604; G06F 21/6209; G06F 17/30867; H04L 63/105; H04L 67/10
See application file for complete search history.

(56) References Cited

U.S. PATENT DOCUMENTS

| | | | |
|---|---|---|---|
| 6,691,106 B1 * | 2/2004 | Sathyanarayan | ........................... G06F 17/30867 |
| 6,816,858 B1 * | 11/2004 | Coden | ............... G06F 17/30855 386/241 |

(Continued)

OTHER PUBLICATIONS

International Search Report and Written Opinion for PCT/US2011/62149, dated Apr. 6, 2012.

*Primary Examiner* — Harunur Rashid
(74) *Attorney, Agent, or Firm* — Loeb & Loeb LLP

(57) ABSTRACT

The UNIFIED ONLINE CONTENT MANAGER APPARATUSES, METHODS, AND SYSTEMS ("Online Content Manager") transforms identification information and selection data inputs via a search engine component, a query interface component, a profile component, a content retrieval interface component, a content management system component and a collaboration component into a profile data output, a generated query output, search results output, and a secure homepage with customized content. In one embodiment, the method includes indexing disparately owned content via a multi-content owner indexing engine; generating a disparately owned content index from the indexing engine; receiving a request to access secure content through a network; automatically constructing a query based on the request without additional input; providing the constructed query to the search engine and running the constructed query against the index; trimming the results; constructing a display by placing the trimmed results of the query within a
(Continued)

multi-source owner template interface; and providing the multi-source owner template interface to a requestor for display.

12 Claims, 18 Drawing Sheets

Related U.S. Application Data

(60) Provisional application No. 61/417,215, filed on Nov. 24, 2010.

(51) Int. Cl.
  *G06F 21/31* (2013.01)
  *G06Q 30/02* (2012.01)
  *G06F 21/60* (2013.01)
  *G06F 21/62* (2013.01)
  *H04L 29/08* (2006.01)

(52) U.S. Cl.
  CPC ........ *G06F 17/30873* (2013.01); *G06F 21/31* (2013.01); *G06F 21/604* (2013.01); *G06F 21/6209* (2013.01); *G06Q 30/02* (2013.01); *H04L 63/08* (2013.01); *H04L 63/101* (2013.01); *H04L 67/10* (2013.01)

(56) References Cited

U.S. PATENT DOCUMENTS

| | | | |
|---|---|---|---|
| 7,017,183 | B1 | 3/2006 | Frey et al. |
| 2002/0049713 | A1 | 4/2002 | Khemlani et al. |
| 2002/0052954 | A1* | 5/2002 | Polizzi ............ G06F 17/30873 709/225 |
| 2006/0031486 | A1* | 2/2006 | Miner ............... G06F 17/30038 709/224 |
| 2009/0183251 | A1 | 7/2009 | Deinlein et al. |
| 2010/0114930 | A1 | 5/2010 | Kalasapur et al. |
| 2011/0219421 | A1 | 9/2011 | Ullman et al. |
| 2012/0173509 | A1 | 7/2012 | Bennett |

* cited by examiner

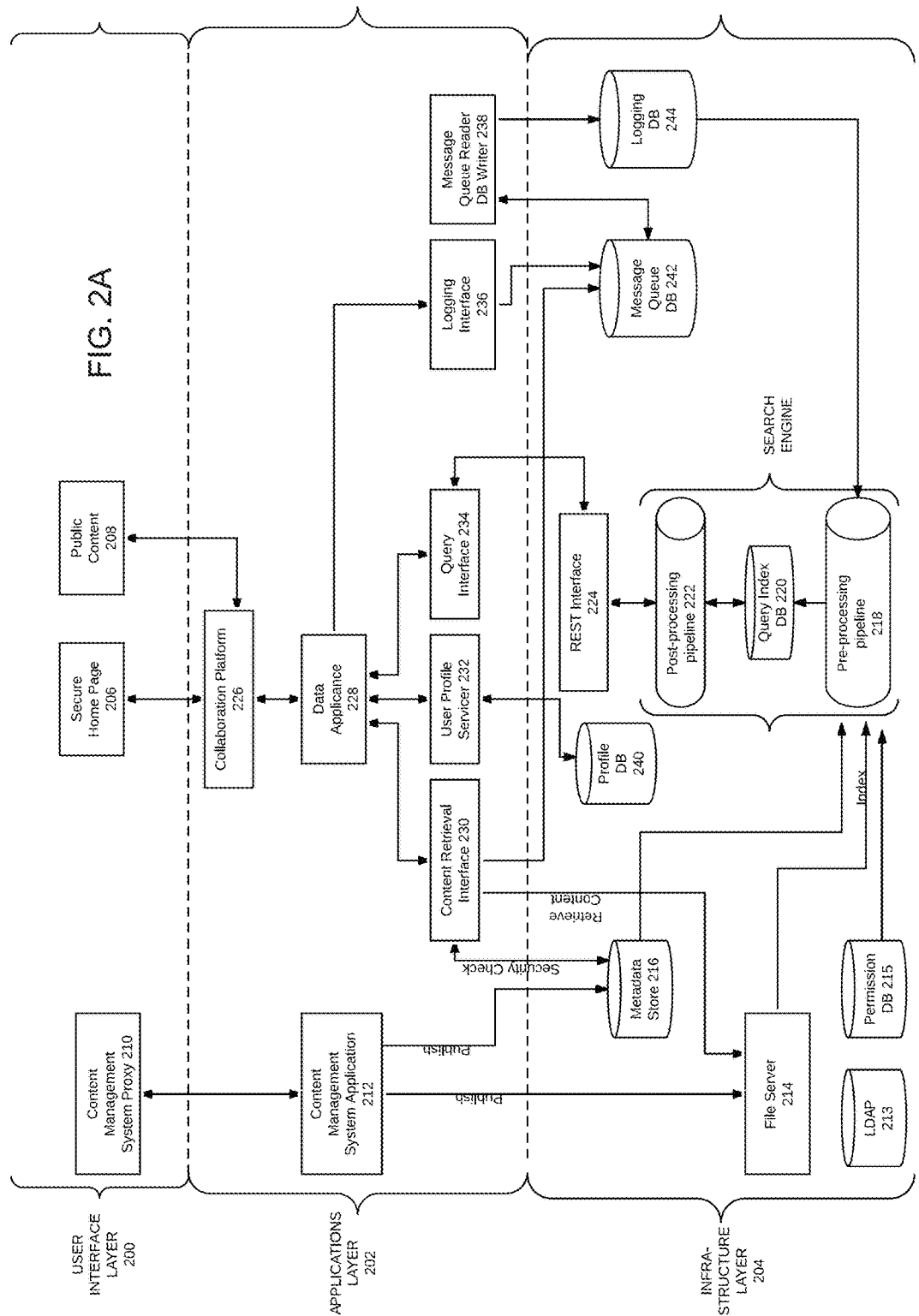

US 10,148,666 B2

UNIFIED ONLINE CONTENT MANAGER APPARATUSES, METHODS, AND SYSTEMS

PRIORITY CLAIM

This application is a continuation of U.S. patent application Ser. No. 13/304,343 entitled "UNIFIED ONLINE CONTENT MANAGER APPARATUSES, METHODS AND SYSTEMS," filed Nov. 24, 2011, and claims priority to U.S. Provisional Patent Application No. 61/417,215 entitled "APPARATUSES, METHODS AND SYSTEMS FOR A UNIFIED ONLINE CONTENT MANAGER," filed Nov. 24, 2010, the entire contents of which are incorporated herein by reference.

This patent application contains material that is subject to copyright, and other intellectual property protection. The respective owners of such intellectual property have no objection to the facsimile reproduction of the patent disclosure document by anyone as it appears in published Patent and Trademark Office files or records, but otherwise reserve all rights whatsoever.

FIELD

The present invention is directed generally to systems for presenting online content to a user, and more particularly, to UNIFIED ONLINE CONTENT MANAGER APPARATUSES, METHODS, AND SYSTEMS.

BACKGROUND

Businesses use tools such as databases and web servers to provide access to company content and services for clients and for employees. Companies also allow users to use in-house intranets.

BRIEF DESCRIPTION OF THE DRAWINGS

The accompanying drawings illustrate various non-limiting, example, inventive aspects of the Online Content Manager in accordance with the present disclosure:

FIGS. 2A-2C are schematic diagrams showing examples of how the architecture of the Online Content Manager may be configured;

DETAILED DESCRIPTION

Introduction

In today's global marketplace, businesses use various tools to provide access to company content and services for clients and for employees, whether they be just around the corner or across the world. Each company faces the challenge of providing relevant and timely information to those that need it while preventing access to the information by those who should not have it. Extranets are one of those tools. An extranet is a secure computer network that allows controlled access to users within the company as well as to users outside of the company. Using an extranet allows a company to grant selective access to affiliates, franchisees, vendors, suppliers, and other partners without granting access to the company's entire network.

Online Content Manager

The UNIFIED ONLINE CONTENT MANAGER APPARATUSES, METHODS, AND SYSTEMS (hereinafter "Online Content Manager") disclosed in this specification allows a company or other organization to provide selective access to company information, applications, and other content via a secure computer network. The selective access is determined based on a user profile, which allows the user to access only the content that he or she is authorized to access. The Online Content Manager uses a search engine to access and surface information to a user without requiring input from the user and without having to provide a structured database query.

The Online Content Manager may be configured to expand a company's global extranet platform to support integrated business functions that might otherwise be hosted by individual regional environments. The Online Content Manager may provide users around the world with a global, single point of access to company information and services. Users of the Online Content Manager may include employees of the company, vendors, suppliers, and other partners or affiliates. The Online Content Manager may be configured to allow company personnel to create temporary access privileges to a selection of company resources. The Online Content Manager is flexible enough to allow varying permissions such that users will be able to access only the content for which they have the appropriate permissions. The Online Content Manager may provide a consistent online access point for each business user with a unified enrollment process that establishes a single point of entry for access to all of a company or organization's applications, services, and other content.

The Online Content manager may provide a consistent and integrated user experience based on internal specifications. Although each user will be presented with a consistent look and feel from the Online Content Manager, the content displayed to each user will be customized for that individual user. In one exemplary embodiment, the user will be shown a custom home page web portal after providing the necessary authentication credentials.

Figure 1A:
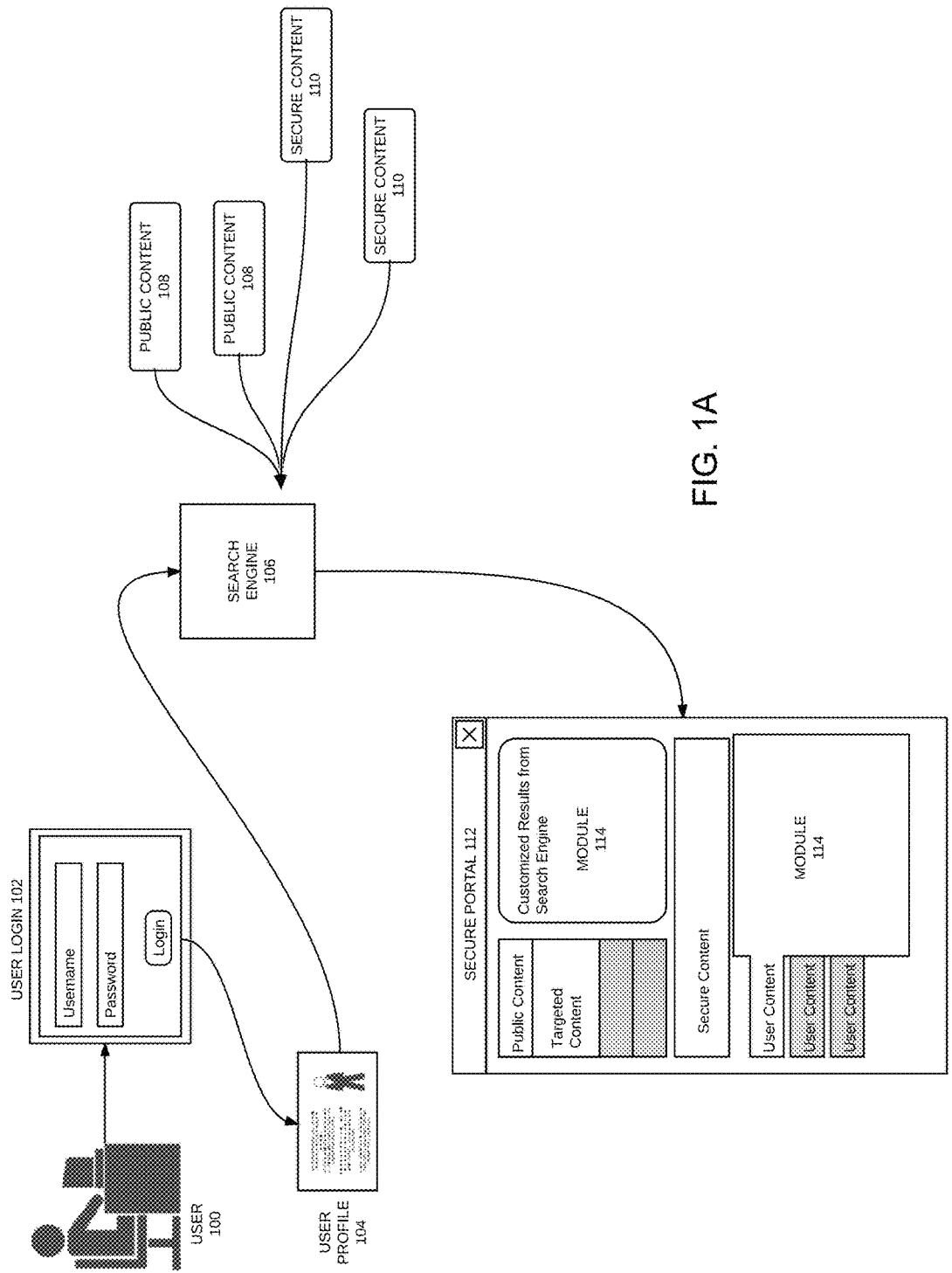
FIGS. 1A-1C are schematic diagrams illustrating aspects of one embodiment of the Online Content Manager.

FIG. 1A is a schematic diagram illustrating one embodiment of the Online Content Manager. As shown, a user 100 may provide a user login information 102, which causes the Online Content Manager to access a user profile 104. A search engine 106 searches for relevant data based on the user's profile, without any input from the user. Search engine 106 will run a search against a data set from a plurality of data sources, including public content sources 108 and secure content sources 110. These data sources may have disparate owners and varying levels of security. The search results are then displayed on a user device in one or more modules within a secure web portal 112.

User 100 may provide login information 102 through any suitable user interface. For example, user 100 may log in to a secure website using any suitable client device. Examples of suitable client devices include a laptop computer, a desktop computer, a tablet computer, and a smart phone, but any device that allows the user to securely login may be used.

In one exemplary embodiment, after logging in, the user is presented with a plurality of modules 114 within secure web portal 112. Each module may include customized content, and the modules may include content generated by the results of the search query that was automatically generated and run against search engine 106 based on the user profile information 104.

Figure 1B:
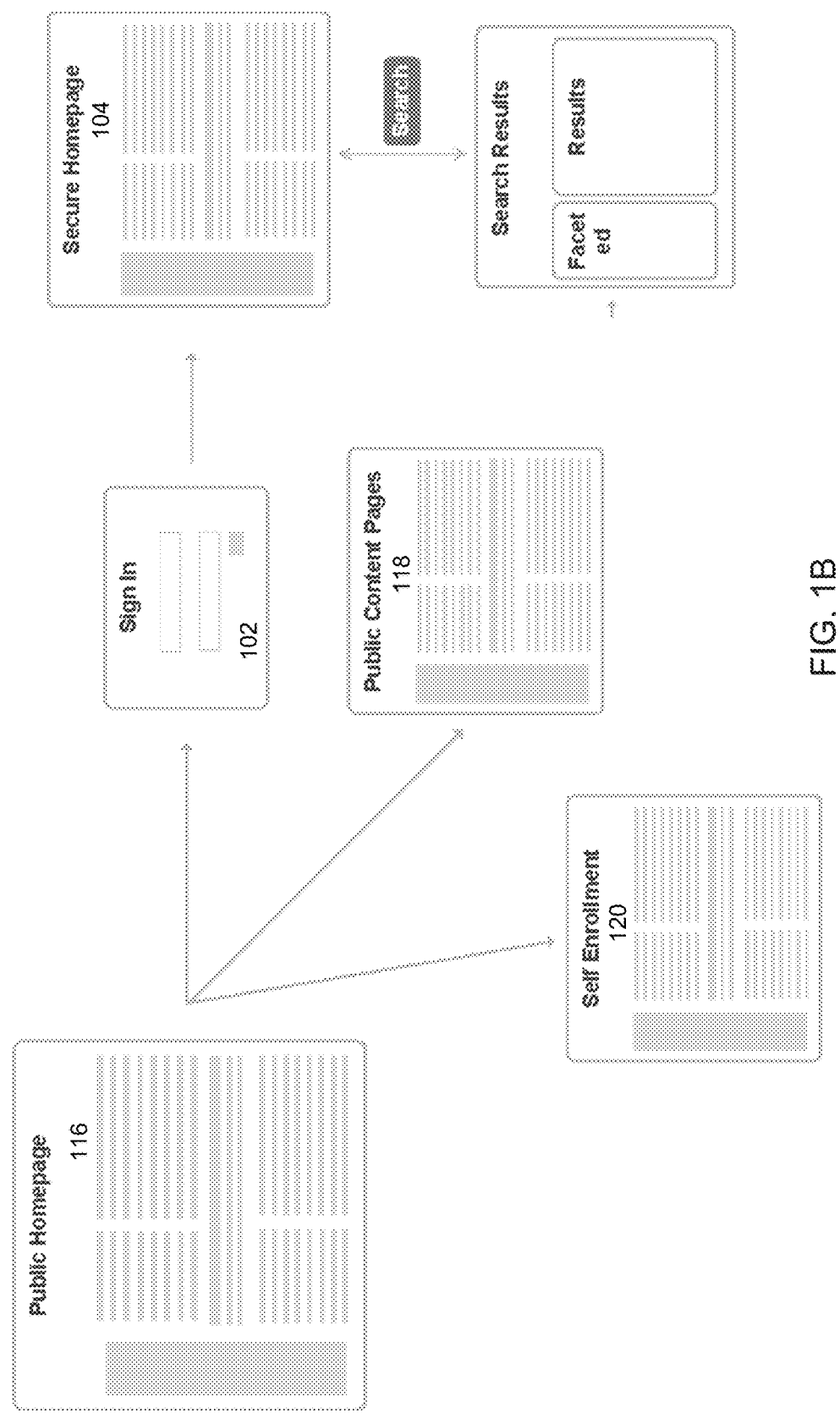

FIG. 1B is a schematic diagram illustrating an additional feature of the Online Content Manager. User 100 may be able to access a public homepage 116 without providing any log in information. Before submitting login information 102, user 100 will be permitted to view public content pages 118, which contain only content that is publically available. User 100 may also be given the option of signing up for access to secure content using a self enrollment page 120. Self-enrollment page 120 may permit the user to enter credentials and receive access to secure content. As shown in FIG. 1B, secure web portal 112 may be at least partially generated based on search results 122 sent from search engine 106.

Figure 1C:
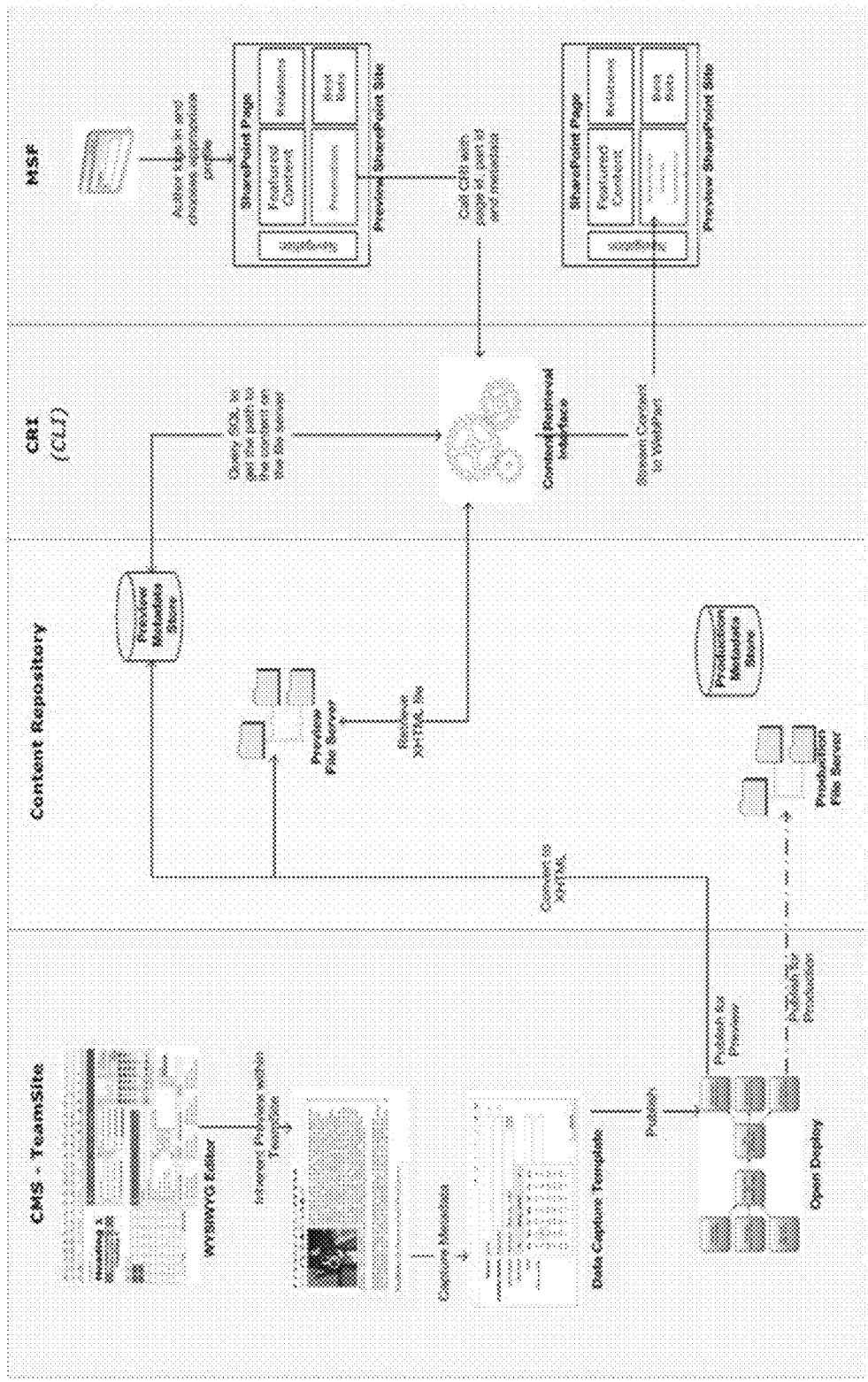

As shown in FIG. 1C, in addition to being able to access content, user 100 may also be able to create content that may then be included in the datastores that will be accessible by other users with appropriate access permission. For example, the Online Content Manager may interface with a content management platform 130. Content management platform 130 may include functionality for content authoring, site design and layout, multivariable testing, content targeting, analytics, workflow and approval, archiving and other features. In one exemplary embodiment, a platform such as Autonomy Teamsite™ may be used as the content management platform. Content management platform 130 may include a WYSIWYG (What You See Is What You Get) editor 132. Editor 132 may allow a user to easily create content which can then be shown in a preview window 133. Once the user is satisfied with the content that has been created, the user may submit the content to the Online Content Manager.

Submission of user-created content to the Online Content Manager may include: capturing the metadata using a data capture template 134, publishing the data using a content distribution platform 136. Autonomy Open Deploy™ is an example of one type of content distribution platform that may be used. Content distribution platform 136 may deploy code or content to any file system, source code management system, or content management system to any network location, including web servers, file servers, database servers, application servers, and network-edge devices.

In one exemplary embodiment content distribution platform 136 publishes the user's created content to a production file server 138 within a content repository 140. Any metadata captured from the created content may be stored in a production metadata store 142 within content repository 140. In exemplary embodiment, content distribution platform 136 converts the user-created content to eXtensible HyperText Markup Language (XHTML) and stores at least a portion of the metadata within a preview metadata store 144 and at least a portion of the user-created content within a preview file server 146.

Other users may then access the user-created content through a collaboration platform 148. In one exemplary embodiment, collaboration platform 148 is Microsoft® Sharepoint® Foundation, but any suitable platform may be used with the Online Content Manager. As shown in FIG. 1C, a user may login to collaboration platform 148 by entering user login information 102. The user may then be able to access secure web portal 112, with a plurality of modules 114.

When the user selects content from within one of the modules, collaboration platform 148 sends a request to a content retrieval interface 150 that may include a page identification, a part identification, and any metadata associated with the content. Content retrieval interface then queries the preview metadata store 144, for example using an SQL query, to get the path to the content on the production file server 138 within content repository 140. Content retrieval interface 150 then retrieves the requested content from the file server in XHTML format and streams to content to the user to the module that the user has selected.

Figure 1D:
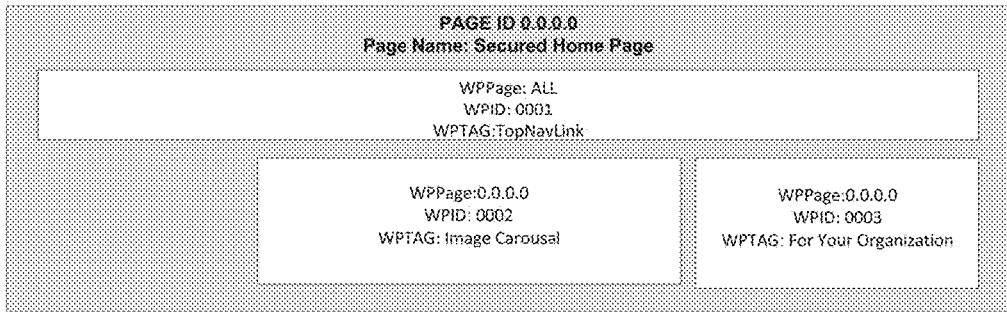
FIG. 1D shows an exemplary embodiment of metadata mapping for access control that may be implemented in the Online Content Manager.
Figure 1D:
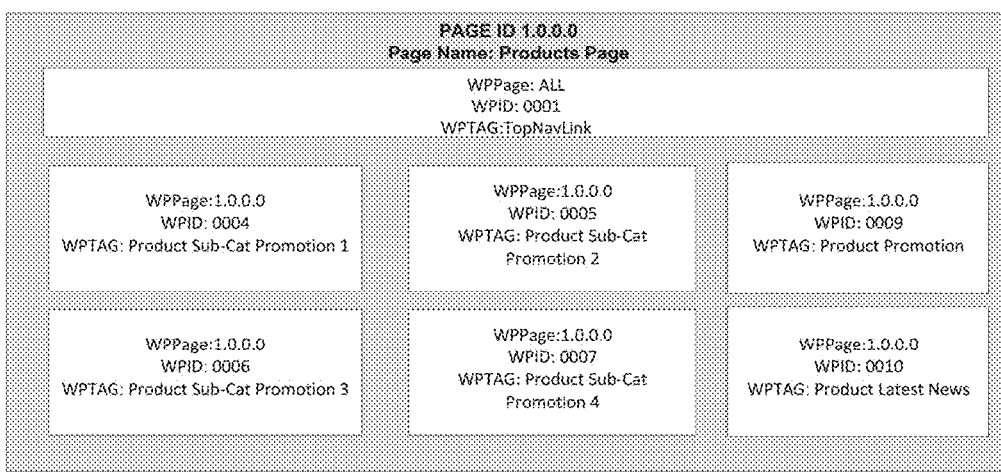

In one exemplary embodiment of the Online Content Manager, metadata is used to control access to the content within content repository 140. FIG. 1D illustrates an exemplary embodiment of metadata mapping used for access control. In one exemplary embodiment, whenever a user creates new content, he or she will have to designate metadata that goes along with that content, using data capture template 134 or similar functionality.

In one exemplary embodiment, an author, that is a user who has created a piece of content, will be required to tag every piece of content with at least two sets of attributes: content security attributes and content targeting attributes. Content security attributes control who has access to the piece of content. In one exemplary embodiment, access must be explicitly given before other users can see the created content. Content targeting attributes prioritize the content so that user content can be presented to the user in the most relevant manner possible.

In one exemplary embodiment, the default security for a created piece of content will be to not allow access to any user. In other words, the author must select the security values that should be applied, or else the content will not be accessible. The corresponding values in the user's profile will determine whether or not they see the content. In one exemplary embodiment, content access is the union of security selections, that is, content access is additive. The data capture template may include hierarchical check-box menus that allow content authors to quickly and easily designate the access permissions that should be included in the metadata for each piece of content.

Security parameters used to tag each piece of content may include geography, organization type (OrgType), organization ID (OrgID), business line (BL), and any other suitable parameter. Parameters may be designated as optional or required. For example, in one embodiment, a country tag, an organization type tag, and a business line tag may be required while an organization ID tag may be optional. Each of these exemplary tags are explained in more detail below.

At least one geography tag may be required for each piece of content. As a geographic choice is added, the content is allowed to that geographic area. The geography tag may include countries, regions, states or provinces within countries, and regions that include at least a portion of a plurality of countries. There may be an option to select all possible countries and regions.

At least one organization type (OrgType) tag may also be required for each piece of content. As an organization type is tagged to a document, that organization type gets included on the list of organization types that can view the content.

At least one business line (BL) tag may also be required for each piece of content. Once the content has been tagged with a business line, users who belong to that business line will be able to view the content.

At least one organization ID (OrgID) type tag may be selected for each piece of content. The organization ID tag denotes the organization that a user belongs to. The organization ID is a specific to each organization. In addition to the organization ID, each organization represented in the system may also belong to an organization type. So if a particular piece of content is tagged with a certain organization type value as well as certain organization ID values, the content will be available to the specific organizations corresponding to the IDs as well as all organizations that fall under the designated organization type. For example, if "Agency" is selected as an organization type tag and "Bank of the West" organization ID is selected, all users belonging to the "Agency" organization type as well as all users belonging to the Bank of the West organization will be able to access the tagged content.

Each user profile includes security parameters such as Geography, OrgType, OrgID, Role, and Rank. By accessing the user profile for each user, the content retrieval interface is able to determine whether a particular user has access permission to any piece of content stored within content repository 140.

The security tags associated with each piece of content may also be used to target content to specific users of the Online Content Manager. While content security attributes control who has access to a piece of content, content targeting attributes prioritize the content so that it can be presented to relevant users in the most relevant manner.

In one exemplary embodiment, targeting may be based on the following attributes: Geography, OrgType, OrgID, Role, Rank, and Created_Date. Created_Date is the date the content was pushed live for use in the Online Content Manager. Various ranking schemas may be used including the following: 1) Geography, Rank, Created_Date; 2) OrgType/OrgID, Rank, Created_Date; 3) Role, Rank, Created_Date; 4) Geography, OrgID/OrgType, Role, Rank, Created_Date(newest first); 5) OrgId/OrgType, Geography, Role, Rank, Created_date(newest first); and 6) Rank, Created_Date. A user may select one of these pre-defined schemas or may create a customized schema. When using the pre-defined schema, the user may be able to choose a value for one or more of the target fields, leaving the others to their default value.

In one exemplary embodiment, the default targeting value for Geography, OrgType/OrgId, and Role is "All" meaning that all users of the Online Content Manager will be able to access the content. The default value for the Rank attribute may be 50 (on a scale of 1-100 where 1 is the highest rank and 100 is the lowest rank). The Created_Date attribute may be used to put a higher value on newer content, all other variables being equal.

Authors may provide one or more of the target fields when choosing a targeting schema. For example, an author may set the Geography parameter to "United States" and leave the other target parameters as "All." Which would allow all users within the United States to view the content. Authors may also provide an additional ranking boost for the content piece by increasing the value of the Rank attribute. This would help in scenarios where two or more content pieces have the same targeting attributes, or when an author or an organization wants to force a specific item to the top of the list.

Relevance of the content for a user of the Online Content Manager is affected by the order of the targeting attributes that are applied, according the targeting schema chosen. For example, in the schema 1) mentioned above, Geography weighted most heavily, followed by Rank and Created_Date.

In addition to targeting functionality provided to authors of the content, a content editor, that is an authorized user with appropriate privileges, may be able to add additional targeting attributes to certain types of content or apply a new targeting scheme to certain types of content.

An exemplary representation of how targeting and security attributes may be used within the Online Content Manager will be shown below with respect to an example user with the following attributes associated with the user profile:

| User | OrgType | OrgId | Geography | BL | Role |
|---|---|---|---|---|---|
| 1 | FI | BofA | US | Commercial | Front office |

As shown above, the user profile may include a user identification number, an organization type, an organization identification, a geographic designation, a business line (BL) attribute, and a role attribute. In this example, the user is a front office employee with Bank of America in the United States. The OrgType is Financial Institution (FI). In an exemplary embodiment, the Online Content Manager may be configured to display the three most relevant pieces of content to the user within a specific module of the secure web portal. As a starting point, there may be 25 pieces of available content, tagged with both security attributes and targeting attributes as shown below:

| | | SECURITY | | | TARGETING | | | |
|---|---|---|---|---|---|---|---|---|
| | OrgId | OrgType | Geography | BL (businessline) | Target-OrgId | Target-OrgType | Target-Geography | Target-Role | Rank# |
| 1. | | All* | All* | All* | All | | All | All | 100 |
| 2. | | Financial | US | Commercial | | Financial | US | Front office | 50 |
| 3. | | Processor | All | All | All | | US, China | Front office, Back office | 40 |
| 4. | | Non-Financial A, B | AUS, IND | All | | A | India | Front office | 30 |
| 5. | | C, D, F, A | LAC | DPS | | A, D | Mexico | | 30 |

-continued

| | | SECURITY | | | | TARGETING | | | |
|---|---|---|---|---|---|---|---|---|---|
| | OrgId | OrgType | Geography | BL (businessline) | Target-OrgId | Target-OrgType | Target-Geography | Target-Role | Rank# |
| 6. | | FI, Processor | CEMEA | All | 1, 2, 3 | | UK, Germany | Back office | 20 |
| 7. | X, Y | Processor | US, CEMEA | All | | Y | US | | 10 |
| 8. | | Financial, A, B, C | Americas All | All | | A, B | US, CAN | Back office | 10 |
| 9. | | Financial | Americas All | Commercial | BOA | Financial | US, CAN, LAC | Front Office | 10 |
| 10. | | Financial | US | All | BOA | Financial | US | Front Office | 50 |
| 11. | | All | All | Commercial | | Financial | LAC | Front office | 50 |
| 12. | | Financial | US, CHINA | All | | All | US, China | Front office, Back office | 50 |
| 13. | | Financial A, B | US, AUS, IND | All | | All | US, India | All | 50 |
| 14. | | All | US, LAC | All | | Financial | All | All | 50 |
| 15. | | FI, Processor | US, CEMEA | All | BOA | | UK, Germany | Front Office | 20 |
| 16. | | All | US, LAC, CEMEA | All | BOA | | US | All | 50 |
| 17. | | Financial, A, B, C | Americas All | All | BOA | A, B | US, CAN, UK, Germany | All | 30 |
| 18. | | Financial | Americas All | Commercial | Wells Fargo | Financial | US, CAN, LAC | Front Office | 50 |
| 19. | | Financial | US | All | BOA | Financial | US | Front Office | 70 |
| 20. | | Financial | US | All | | | | | |
| 21. | | All | US, LAC, CEMEA | All | | Financial | All | Back Office | 50 |
| 22. | | Financial, A, B, C | Americas All | All | BOA | | US | Front Office | 100 |
| 23. | | Financial | Americas All | Commercial | | All | US, CAN, LAC | Front Office | 10 |
| 24. | | Financial | US | All | BOA | Financial | All | Front Office | 10 |
| 25. | | Financial | US | All | | All | US, LAC | Back Office, Front Office | 90 |

Online Content Manager may execute a security trimming process by comparing the user profile attributes with the security attributes. Security trimming removes all content from a data set that the user is not authorized to access. Based on the user profile and content security tags or attributes, only items 1, 2, and 8-25 remain as potential candidates for display in the module.

Next, the content set may be prioritized based on the targeting attributes. In one embodiment, the following targeting schema is used: Geography, OrgType/OrgId, Role. First, the remaining data set after security trimming is sorted/matched by Geography. Since the user's attribute for Geography is "US," items 11 and 15 are pushed down to the bottom of the list—because they do not designate the US within the Geography targeting attribute. Although item 11 has a security attribute for Geography that is set at "All," the targeting attribute for Geography is set to "LAC," so it is sent to the end of the sorted list.

Next, the remaining items in the data set are sorted/matched based on the OrgType/OrgId targeting attribute. The user's OrgType="Financial Institution" (FI) and the user's OrgId="Bank of America" (BOA). As a result, item 8 is sent to the bottom of the list, although it may be placed in a position above the items that did not match the Geography attribute. Item 8 is sent down the list because it does not have either BOA as the OrgId or FI as the OrgType.

Finally, the remaining items in the data set are sorted/matched based on the Role targeting attribute. Because items 10, 9, and 1 all match the user on all three attributes (Geography, OrgType/OrgId, and Role) they will be ranked highly on the ordered list. If there are three content areas available within a module, items 10, 9, and 1 would be displayed to the user. In one exemplary embodiment, the items will be ranked in the order of the specificity of the match. For example, if there are no items that match all three attributes, items matching only two variables may be shown followed by items matching only one variable.

As explained above, any targeting schema can be used in a similar manner. For each schema, the targeting attribute listed first may be afforded greater weight in determining the content that will be displayed to the user.

FIG. 2A is a schematic diagram showing one example of how the architecture of the Online Content Manager may be configured. As shown, the Online Content Manager may be implemented in a multitier architecture configuration with at least three layers, including a user interface layer 200, an applications layer 202, and an infrastructure layer 204.

User interface layer 200 may include one or more user interfaces that allow a user to interact with the other layers and to access content and applications provided by those layers. In one exemplary embodiment, the user interface layer may include a secure web portal 206 accessible by a web browser running on a computer. Web portal 206 may allow a user to login or otherwise provide authentication credentials to access secure content. User interface layer 200 may also provide access to public content 208. Public content 208 may accessible through a web browser by any user visiting a webpage with public content, without providing any credentials. In one exemplary embodiment, the web portal 206 may be configured to include both secure content and public content.

In addition to the web portal, the user interface layer may include a proxy 210 for a content management system. Proxy 210 may be accessible through a web browser. The proxy may also be an application installed locally on a user's machine. Proxy 210 may allow a user who supplies the appropriate credentials to create content and upload that content to datastores housed within infrastructure layer 204. In one exemplary embodiment, proxy 210 interacts with a content management application 212 found within applications layer 202. Content management application 212 may be running on a remote server, locally on the user's computer, or in any other suitable location. Content management application 212 in turn may access a file server 214 housed within infrastructure layer 204. A Lightweight Directory Access Protocol (LDAP) application 213 and a permissions database 215 may be associated with the file server. The LDAP application 213 and the permissions database work together to provision and manage user profiles. This arrangement allows an authorized user to create or edit content that can then be indexed and accessed by other users within the company.

In one exemplary embodiment, the user may be able to set permissions that control access permissions to the content created by the user. As explained above, a user may be required to tag each piece of created content with appropriate security parameters, including geography, organization type, organization ID, and business line. In another exemplary embodiment, user permissions may be automatically be set based on the profile of the user creating the content. For example, a user belonging to an accounting division within a company may create content that discloses sensitive financial information. In this case, the Online Content Manager may automatically restrict access to the created content, based on the type of content and on the user who created the content.

In one exemplary embodiment, content management application 212 is configured to capture metadata from the content created by users. For example, after a user has created content in the content management application, the user may then have the option of publishing the content. When the content is published, it is stored in a database accessed by a file server 214. Metadata is also extracted from the content and sent to a metadata store 216. The contents of metadata store 216 and the content database are both indexed on a continual basis and sent to a pre-processing pipeline 218, which interfaces with a query index database 220, which in turn interfaces with a post-processing pipeline 222. Post processing pipeline 222 may interface with a with a Representational State Transfer (REST) interface 224.

Applications layer 202 may also include a collaboration platform 226, a data appliance 228, a content retrieval interface 230, a user profile servicer 232, a query interface 234, a logging interface 236, and a message queue reader 238. When a user enters his or her login information or when the user requests certain content from with the secure web portal 206, one or more of these components of applications layer 202 may be used to deliver the requested content to the user.

For example, when a user requests content displayed within a module of secure web portal 206, web portal interfaces with collaboration platform 226 and data appliance 228 to retrieve the content. In one exemplary embodiment, data appliance 228 is an XML appliance capable of processing and transforming XML messages. Data appliance 228 may also interface with content retrieval interface 230, user profile servicer 232, and query interface 234.

These three components may work together to retrieve the requested content and determine whether the user has permission to view the requested content. For example, query interface 234 may request communicate with REST interface 224 to request the content. Once the content has been retrieved, user profile servicer 232 may query a profile database 240 to retrieve user profile information. Content retrieval interface 230 then checks the information in the user profile against the security parameters in the metadata store 216 associated with the requested content. If the user has permission to view the content, the content is then sent on to secure web portal 206 by way of data appliance 228 and collaboration platform 226.

A message queue database 242 and a logging database 244 may also be contained within the infrastructure layer 204. Message queue database may be accessed by logging interface 236 and content retrieval interface 230. Logging database may be accessed by message queue reader 238 and by pre-processing pipeline 222.

Figure 2B:
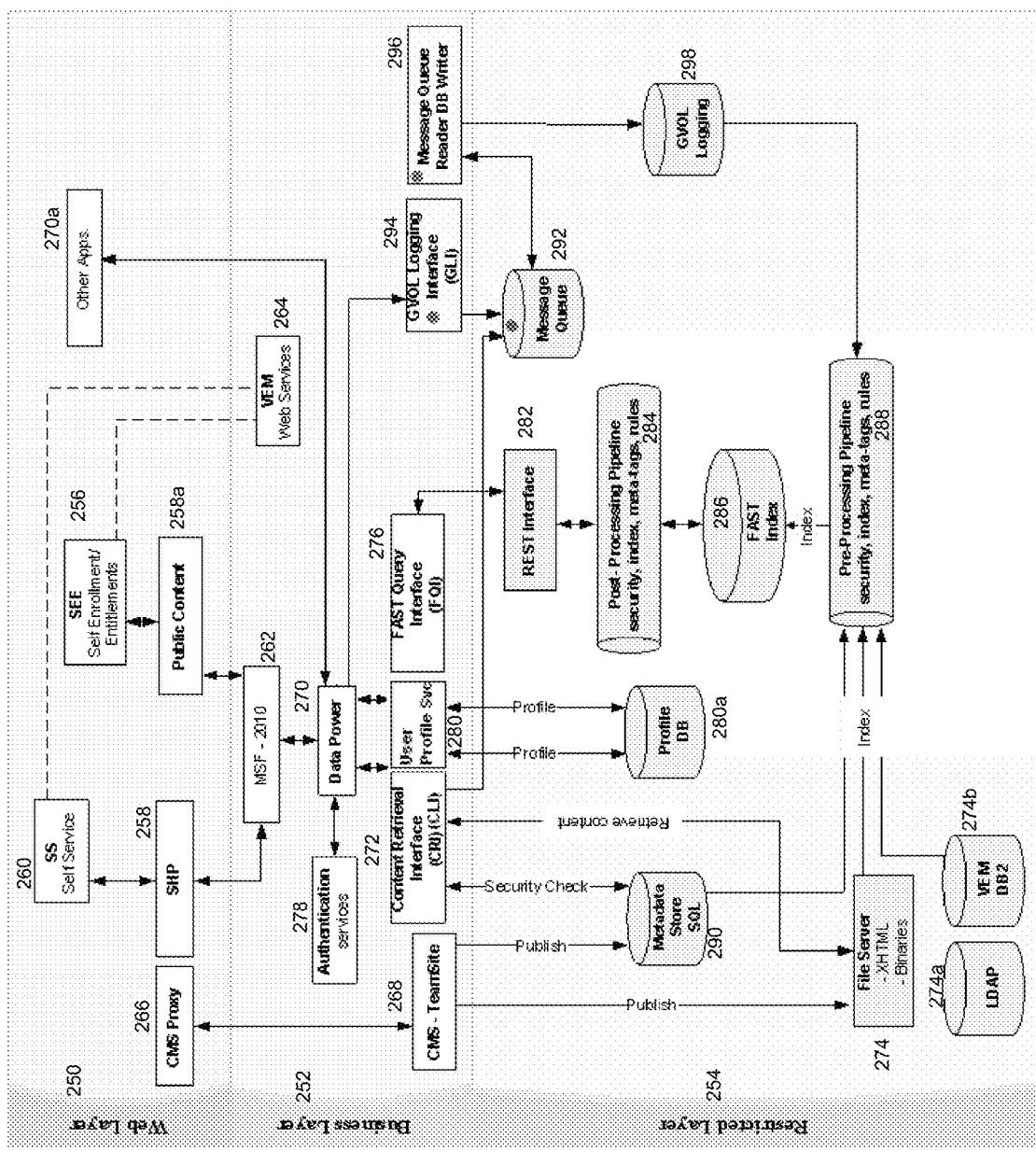

FIG. 2B is a schematic diagram another exemplary embodiment of the architecture of the Online Content Manager, similar to the schematic shown in FIG. 2A. As shown, the Online Content Manager may be implemented in a multitier architecture configuration with at least three layers, including a web layer 250, a business layer 252, and a restricted layer 254. As shown the Online Content Manager may include a Self Enrollment/Entitlements (SEE) component 256 that allows users to sign up for access to a Secure Home Page (SHP) 258. A Self Service (SS) component 260 may allow users to add or modify entitlements. Entitlements are portions of the secure content that the user is given permission to access through the Secure Home Page. The Secure Home Page 258 may be an extranet site available only to users who have provided appropriate login credentials. Public Content 258a may also be available to general public users who do not have access to the Secure Home Page 258.

The collaboration platform 262 that hosts the framework for the Online Content Manager embodiment shown in FIG. 2B may be Microsoft® Sharepoint® Foundation (MSF). The Entitlements Manager (VEM) 264 provisions and manages user profile information. A Content Management System (CMS) proxy 266 in the web layer may interface with a CMS Application 268, for example Autonomy Teamsite™. The CMS proxy 266 and CMS application 268 may allow content authoring and publishing. A Data Power XML appliance 270 may be used to process XML messages and for transformation of the messages. The XML appliance 270 may communicate with a Content Retrieval Interface (CRI) 272, a User Profile Servicer 280, and a Fast Query Interface (FQI) 276. CRI may be a custom component that retrieves XHTML and binary content from a file server 274. The file server may interface with an LDAP database 274a and an entitlement manager (VEM) database 274b. In one embodiment, the CRI may be a custom Microsoft® .NET component. The User Profile Servicer 280 may access a user profile database 280a. The FAST Query Interface (FQI) 276 may be a custom component that passes FAST Query Language (FQL) queries to a search server and retrieves appropriate content. Other applications 270a may also interface with the Data Power appliance 270. The FQI may communicate with a search engine through a REST interface 282, which in turn interfaces with a post-processing pipeline 284, a FAST index 286, and a pre-processing pipeline 288. CRI 272 may also interface with a Metadata Store 290 and a Message Queue 292. In one embodiment, the search server is a Microsoft® FAST Search Server. A Logging interface 294 may also access Message Queue 292, which may send the messages to a Message Queue Reader DB Writer 296, which in turn sends the messages to a logging database 298.

A logging interface (GLI) 278 may be a custom component that allows end-to-end exception management. Authentication Services (AS) may be a service that authenticate a user's credentials, for example, using a CA SiteMinder® application for login and adaptive Authentication.

Figure 2C:
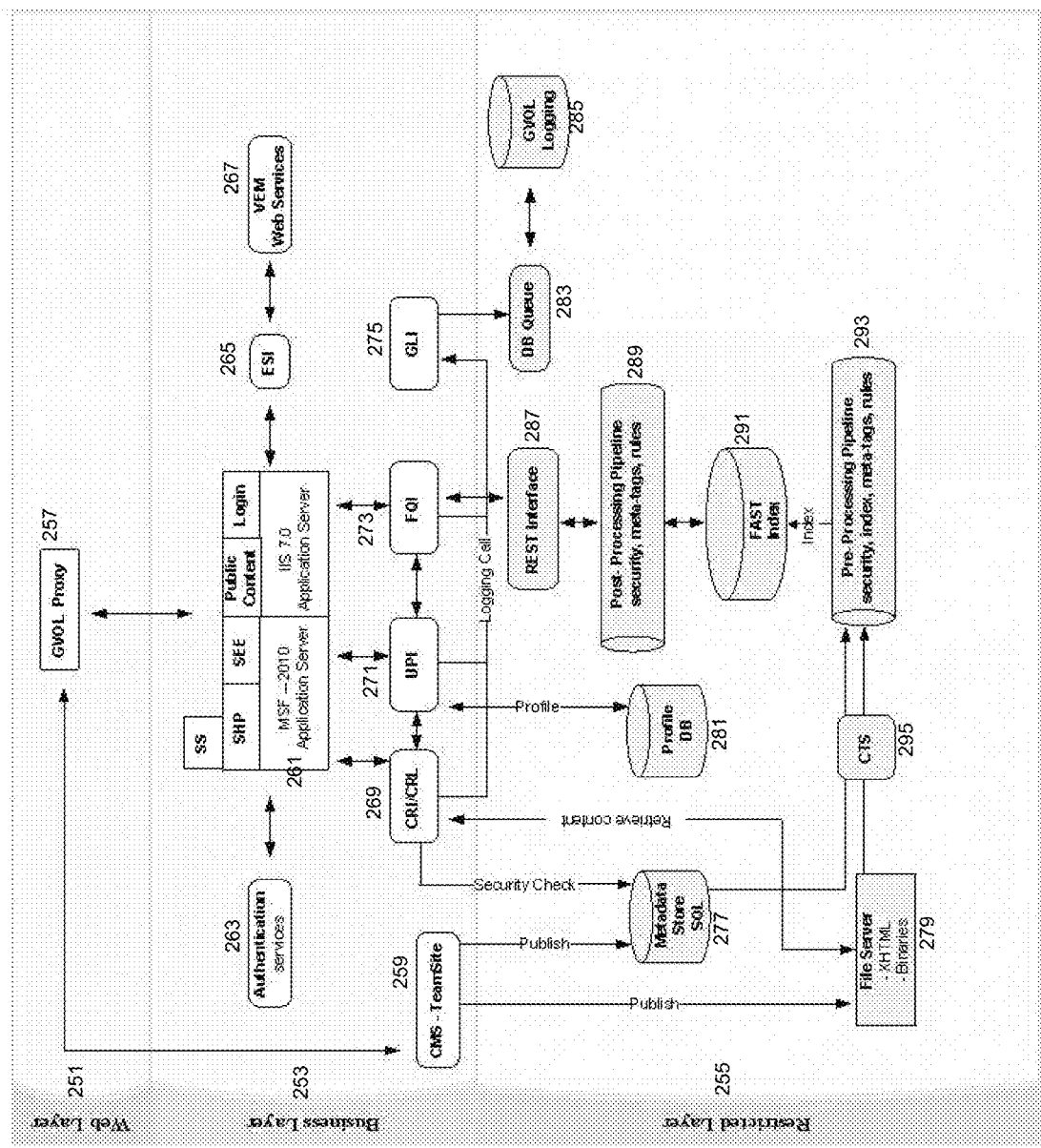

FIG. 2C is a schematic diagram of yet another exemplary embodiment of the architecture of the Online Content Manager. This embodiment also has three layers—a web layer 251, a business layer 253, and a restricted layer 255, but moves most of the components of the Online Content Manager from the web layer into the business layer. As shown in FIG. 2C, the only component in the web layer 251 is a Proxy 257 that interfaces with a Content Management System (CMS) application 259 and with one or more application servers 261 within the business layer. As shown, the application servers may include one or more Microsoft® Sharepoint® Foundation servers and one ore more Microsoft® IIS servers. These servers may include Self Service (SS) component that allows a user to sign up for access to secure content on the servers; a Self Enrollment/Entitlements (SEE) component that allows a user to add or modify entitlements, that is, what the user is entitled to access; a Public Content component that allows users who are not logged in or who do not have access rights to view information that is available to the general public; and a Login component, which allows an authorized user to enter credentials and gain access to a Secure Home Page (SHP).

The application servers may also interface with Authentication services 263, Data Power XML appliances (ESI) 265 for processing XML messages and transformation, and with an Entitlements Manager (VEM) 267 that provides and manages user profile information.

When a user requests secure information from the Secure Home Page, the application servers also interface with four additional components in the business layer: a Content Retrieval Interface (CRI) 269, a User Profile Interface (UPI) 271, a FAST Query Interface (FQI) 273 and a Logging Interface (GLI) 275. The FQI may be a custom RESTful web service that passes queries to a search engine and retrieves appropriate content. The UPI may also be a custom RESTful web service that retrieves the user's profile information. The CRI may also be a custom RESTful web service that retrieves XHTML and binary content from the File Server and checks the security credentials of the user before the content is passed back to the user.

These four additional components interface with several components on the secure restricted layer. For example, the CRI accesses a Metadata Store 277 to perform the security check, and retrieves the requested content from a File Server 279. The UPI accesses a profile database 281 on the restricted layer, and the GLI accesses a database queue 283 and a logging database (GVOL) 285. The FQI interfaces with a search engine, which includes a REST interface 287, a Post-Processing Pipeline 289, an index database 291, and a Pre-Processing Pipeline 293. A Content Transformation Services (CTS) component, also on the restricted layer, sends content from the File Server 279 and the Metadata Store 277 to the pre-processing pipeline of the search engine where it can then be indexed by the search engine.

Figure 3:
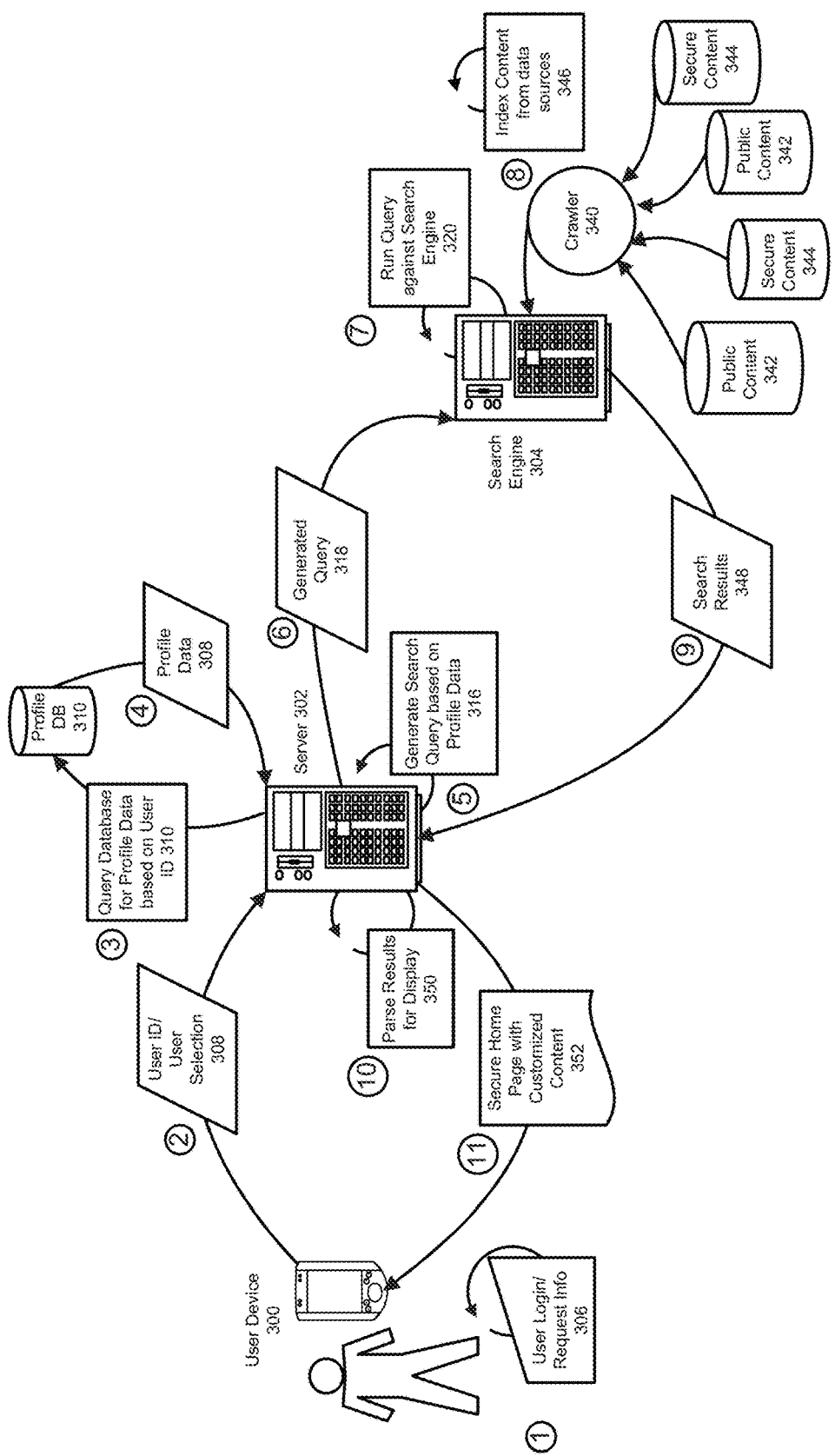
FIG. 3 is a data flow diagram showing an exemplary embodiment of the operation of the Online Content Manager.

FIG. 3 is a data flow diagram showing an exemplary embodiment of the operation of the Online Content Manager. Although FIG. 3 depicts the interactions between a user device 300, a server 302, and a search engine 304, a variety of other components and configurations may be used by the Online Content Manager during operation. Server 302 may be a plurality of servers, and search engine 304 may be implemented by any suitable combination of hardware and software components. Likewise, user device 300 may be any suitable device that allows a user to connect to server 302 and search engine 304 through a network. The network may be the Internet, a wide-area network, one or more intranets, one or more extranets, or any other suitable computer network. Examples of suitable user devices include, but are not limited to, a laptop computer, a desktop computer, a tablet computer, and a smart phone.

As shown in FIG. 3, a user is able to gain access to a customized, secure web portal through a user interface on user device 300 by providing access credentials, 306. Access credentials may include a user name and password, a biometric identifier, a secure token, a combination of these, or any other combination of credentials that will allow the identity of the user to be verified. In an exemplary embodiment, user device 300 sends user identification (user ID) information or user selection information 308 to server 302. The user selection information may be a uniform resource locator (URL), a click, a selection from a widget such as a pop-up menu or text query, and the like. At 310, server 302 then queries a user profile database 312 based on the user ID information 308 provided, to determine whether a profile exists for the user. If a profile does not exist, the user may be prompted to create a profile.

The profile may include information such as the name and contact information of the user, the user's role within the company or the user's relationship with the company, the level of access permission to company resources, the user's relationships to other people within the company or affiliated with the company, user content preferences, usage and access history and other metrics, and any other suitable information that may be useful in generating a customized query based on the user profile. Information contained in the user profile may be inputted directly by the user, or may be based on data collected about the user. In one exemplary embodiment, collection of information is opt-in, that is, the user may have control over his or her user profile and may determine the type of information that the Online Content Manager collects and the level of detail of that information. Once the existing user profile is found, user profile data 314 specific to the user is extracted from user profile database 312 and sent back to server 302.

For example, user profile data may be sent from database 312 in XML format, similar to the example below:

```
<?XML version = "1.0" encoding = "UTF-8"?>
<user_profile_data>
        <timestamp>2011-12-22 17:00:01</timestamp>
        <user_id>
                <user_name>Don Juan</user_name>
                <user_email>djuan@company.com</user_email>
                <user_work_address>20 Terrace Place</user_work_address>
                <employee_id_no>2586415</employee_id_no>
                <user_tel>212-578-3472</user_tel>
        </user_id>
        <user_permission_attributes>
                <user_geography>US</user_geography>
                <user_org_type>Financial Institution</user_org_type>
```

```
        <user_org_id>Bank of America</user_org_id>
        <user_role>Front Office</user_role>
        <user_business_line>Commercial</
            user_business_line>
    </user_permission_attributes>
<user_profile_data>
```

As shown at 316 in FIG. 3, sever 302 then automatically generates a search query based on user profile data 314. In one exemplary embodiment, generated query 318 may be a Representational State Transfer (REST) call with a list of parameters. In one exemplary embodiment, the list of parameters is sent as an HTTP(S) POST message so that the values are sent as part of the HTTP header request and not as part of the query string. These parameters may be retrieved from an authenticated (logged in) user. This HTTP(S) POST request may be formatted similar to the following example:

```
<CRIRequestContract xmlns="http://schemas.GVOL.CRI">
    <FunctionalRole>CST</FunctionalRole>
    <Language>en-US</Language>
    <LocationCountryCode>840</LocationCountryCode>
    <OrgID>10888215</OrgID>
    <OrgType>S</OrgType>
    <SortScheme>2147483647</SortScheme>
    <UserID>nasri6385u</UserID>
    <VBLCode>S</VBLCode>
</CRIRequestContract>
```

The search query may take the form of a uniform resource locator (URL) may then be accessed by server 302 to initiate the search at the search engine 304. For example, the URL may take the following form:

```
http://HostName.com:PORT/GVOL.CRI/CRI.svc/CRI/ContentList/
WPPage/{WPPage}/WPID/{WPID}/WPTAG/{WPTAG}/
MaxCount/{MaxCount}
```

A parameter within the URL may determine which module to pull information for. In this manner, the Online Content Manager can target a request for information that will be displayed within a specific module on the secure web portal. For example, the following query would pull content that would populate a module containing marketing information:

```
http://sw730voldmsfw01.vol1dev.com:20402/GVOL.CRI/CRI.svc/CRI/
ContentList/WPPage/0.1.0.0.0/WPID/10001/WPTAG/
"Marketing+Carousel"/MaxCount/5
```

As shown at 320 in FIG. 3, generated query 318 is then run against search engine 304. Search engine 304 interfaces with a spider or crawler 340. Crawler 340 is a computer program that continually browses and catalogs a set of datastores to provide the most up-to-date information for a search engine. For example, crawler 340 may visit each piece of content housed in a datastore and create a copy of that content, which will then be indexed by search engine 304. In one exemplary embodiment, crawler 340 creates a copy of each webpage or other document found in one or more public databases 342 and/or one or more secure databases 344 that are only available based on user permissions.

As shown at 346 in FIG. 3, search engine 304 may index the content gathered by crawler 340 using an indexing engine so that search engine 304 has access to the most up-to-date information present in the datastores. As shown at 348, search engine 304 may return the results of the search back to server 302. In one exemplary embodiment, server 302 may send the search results 348 in an Extensible Markup Language (XML) format. For example, results of a search may take the following form:

```
<?xml version="1.0" encoding="utf-16"?>
<ArrayOfUsp_GetContent_Result xmlns:xsd="http://www.w3.org/
2001/XMLSchema" xmlns:xsi="http://www.w3.org/2001/XMLSchema-
instance">
    <usp_GetContent_Result>
        <ContentID>30404</ContentID>
        <Title>Hero SHP Content</Title>
        <vPath>/_layouts/GVOL/GVOLStream.aspx?filepath=\root\images\
hero_images\Big-Promo_People_opt2.jpg&amp;filetype=
image/jpg</vPath>
        <Description>Deployed from CMS.</Description>
        <PromoLink>http://www.yahoo.com/</PromoLink>
        <MIMEType>image/jpg</MIMEType>
        <PublishDate>2011-11-15T06:58:48</PublishDate>
        <TrgtCountryScore>A</TrgtCountryScore>
        <TrgtOrgScore xsi:nil="true" />
        <TrgtFRScore xsi:nil="true" />
    </usp_GetContent_Result>
    <usp_GetContent_Result>
        <ContentID>30401</ContentID>
        <Title>Hero - Testing MSF</Title>
        <vPath>/_layouts/GVOL/GVOLStream.aspx?filepath=\root\
images\section\Visa_Signature_Card.png&amp;filetype=image/
png</vPath>
        <Description>Hero - Testing MSF</Description>
        <PromoLink>/SitePages/GVOLHome.aspx?pageid=
0.1.0.0.0</PromoLink>
        <MIMEType>image/png</MIMEType>
        <PublishDate>2011-11-14T08:11:52</PublishDate>
        <TrgtCountryScore>A</TrgtCountryScore>
        <TrgtOrgScore xsi:nil="true" />
        <TrgtFRScore xsi:nil="true" />
    </usp_GetContent_Result>
    <usp_GetContent_Result>
        <ContentID>30397</ContentID>
        <Title>Hero Content latest</Title>
        <vPath>/_layouts/GVOL/GVOLStream.aspx?filepath=\root\
images\hero_images\Big-Promo_BGraphic_opt2.jpg&amp;
filetype=image/jpg</vPath>
        <Description>Hero Content latest deployed from CMS</Description>
        <PromoLink>http://www.rightcliq.visa.com/</PromoLink>
        <MIMEType>image/jpg</MIMEType>
        <PublishDate>2011-11-11T09:17:55</PublishDate>
        <TrgtCountryScore>A</TrgtCountryScore>
        <TrgtOrgScore xsi:nil="true" />
        <TrgtFRScore xsi:nil="true" />
    </usp_GetContent_Result>
    <usp_GetContent_Result>
        <ContentID>30376</ContentID>
        <Title>Hero Alerts1</Title>
        <vPath>/_layouts/GVOL/GVOLStream.aspx?filepath=\root\
images\hero_images\sphero1.PNG&amp;filetype=
image/png</vPath>
        <Description>Hero Alerts1 CMS Notification</Description>
        <PromoLink>http://www.google.com/</PromoLink>
        <MIMEType>image/png</MIMEType>
        <PublishDate>2011-11-02T10:27:48</PublishDate>
        <TrgtCountryScore>A</TrgtCountryScore>
        <TrgtOrgScore xsi:nil="true" />
        <TrgtFRScore xsi:nil="true" />
    </usp_GetContent_Result>
</ArrayOfUsp_GetContent_Result>The thread '<Thread Ended>'
(0x76c) has exited with code 0 (0x0).
```

Figure 6A:
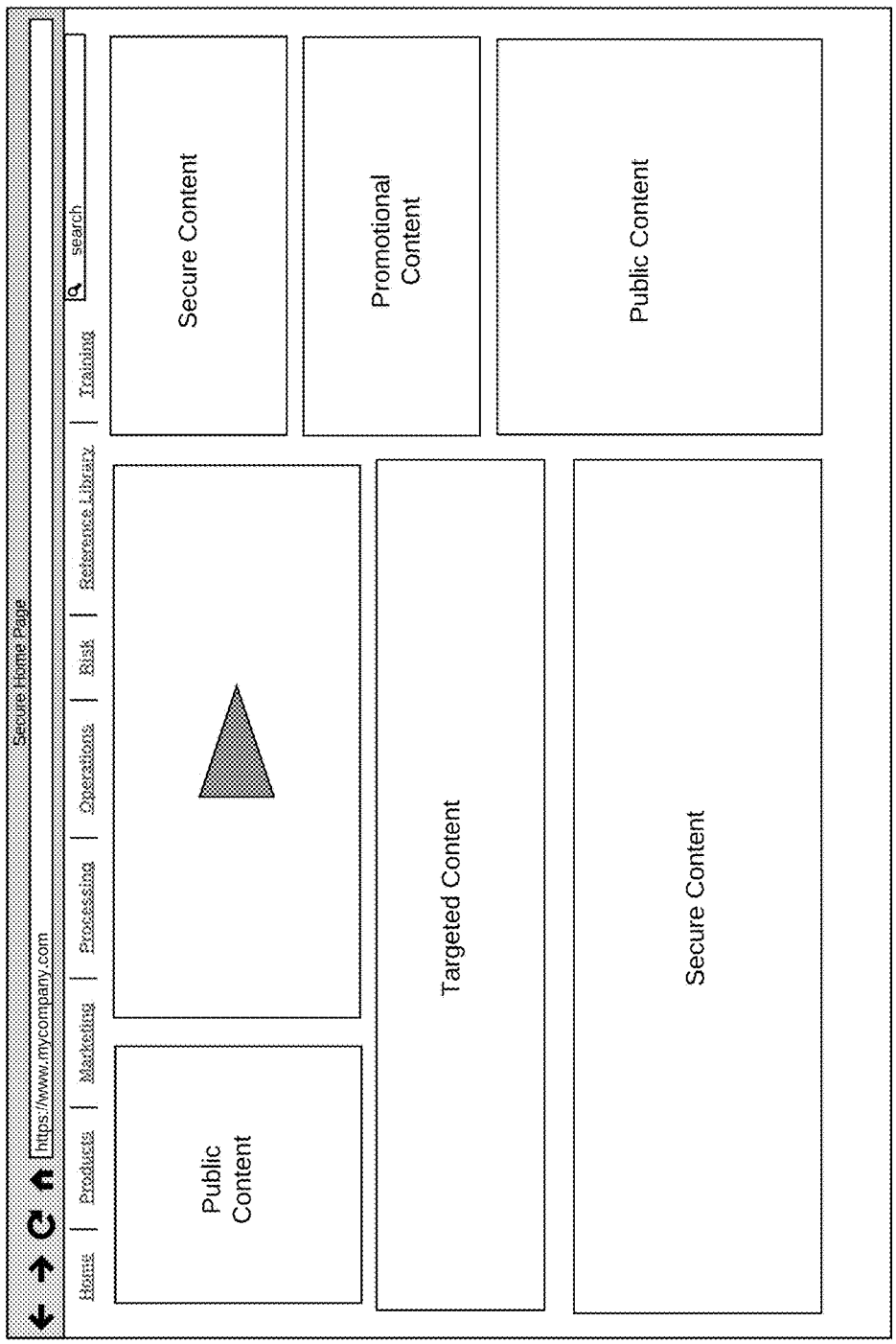
FIGS. 6A and 6B illustrate exemplary embodiments of a secure home page or web portal that may be displayed on a user device by the Online Content Manager.
Figure 6B:
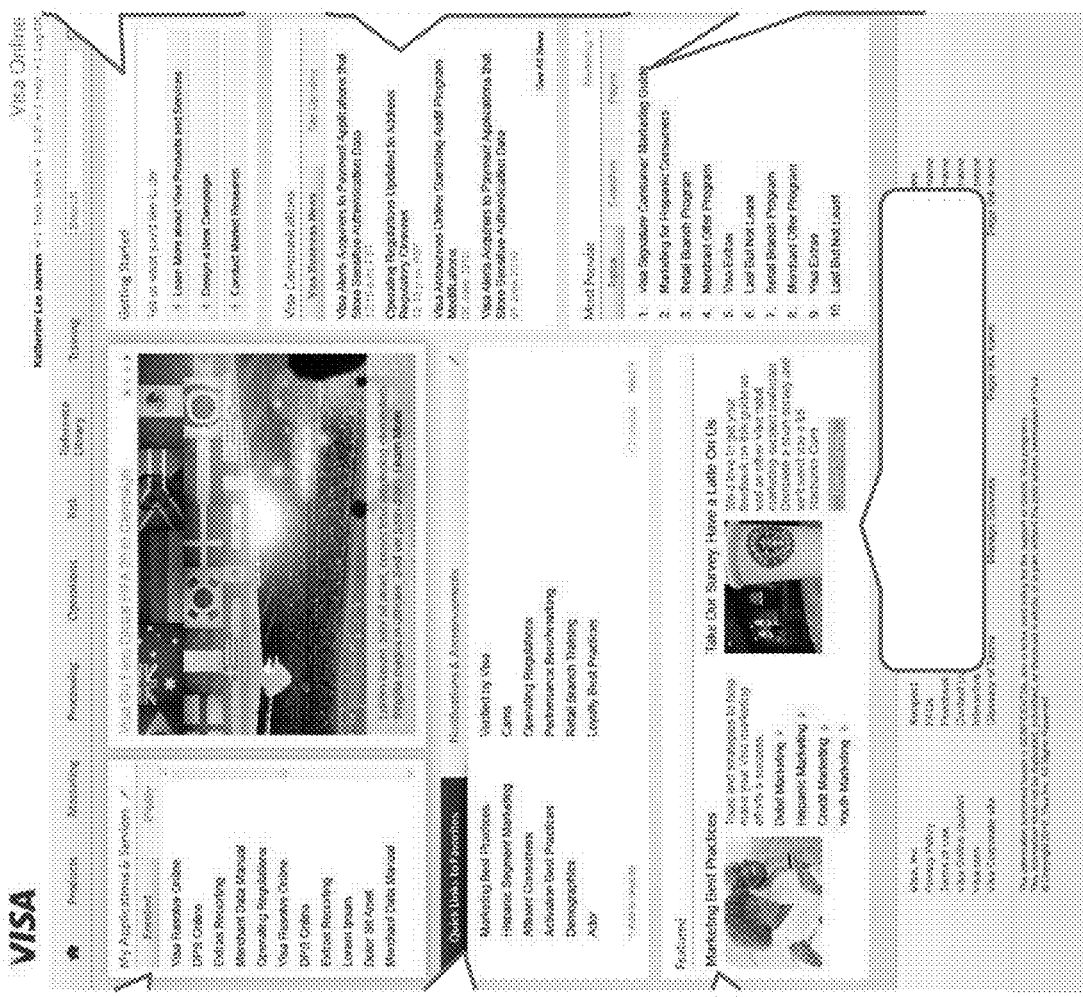

Server 302 may parse search results 348 and format the results for display, as shown at 350 in FIG. 3. Once the results have been formatted for display within one or more modules on a secure web page 352, as shown in FIGS. 6A and 6B, the formatted results are sent to user device 300, which displays the secure, customized content to the user. In one exemplary embodiment, server 302 receives the search results 348 in XML format and converts the XML into a Hyper Text Markup Language (HTML) page, which is then displayed on user device 300.

A similar process may occur after the user has logged in and requested secure content. The User selection will be sent to server 302, which generates a query and returns the results requested by the user.

Figure 4A:
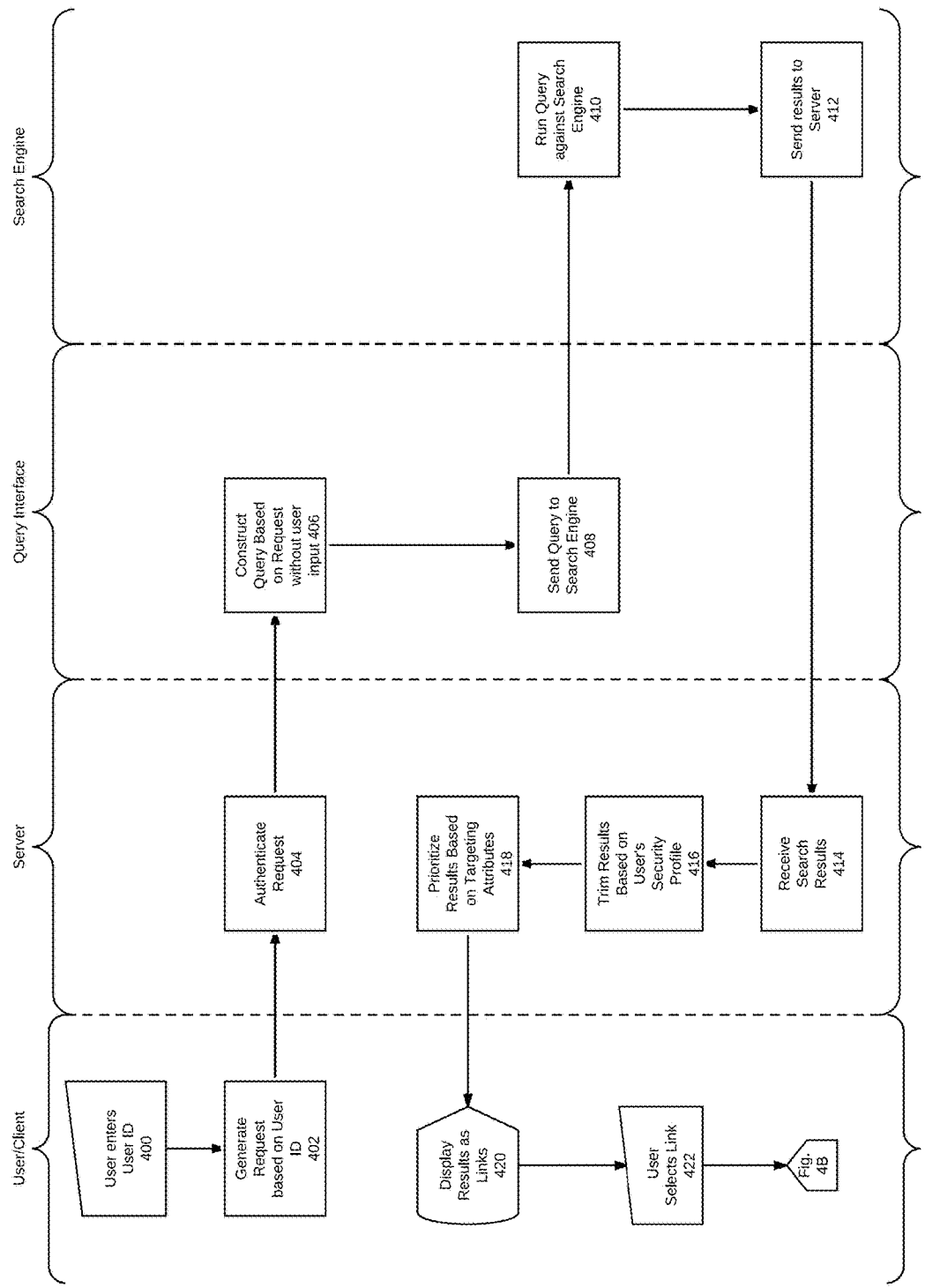
FIGS. 4A and 4B are logic flow diagrams illustrating an example of the process of receiving user ID information and transforming that information into customized content displayed to the user, which may be executed in one embodiment of the Online Content Manager.
Figure 4B:
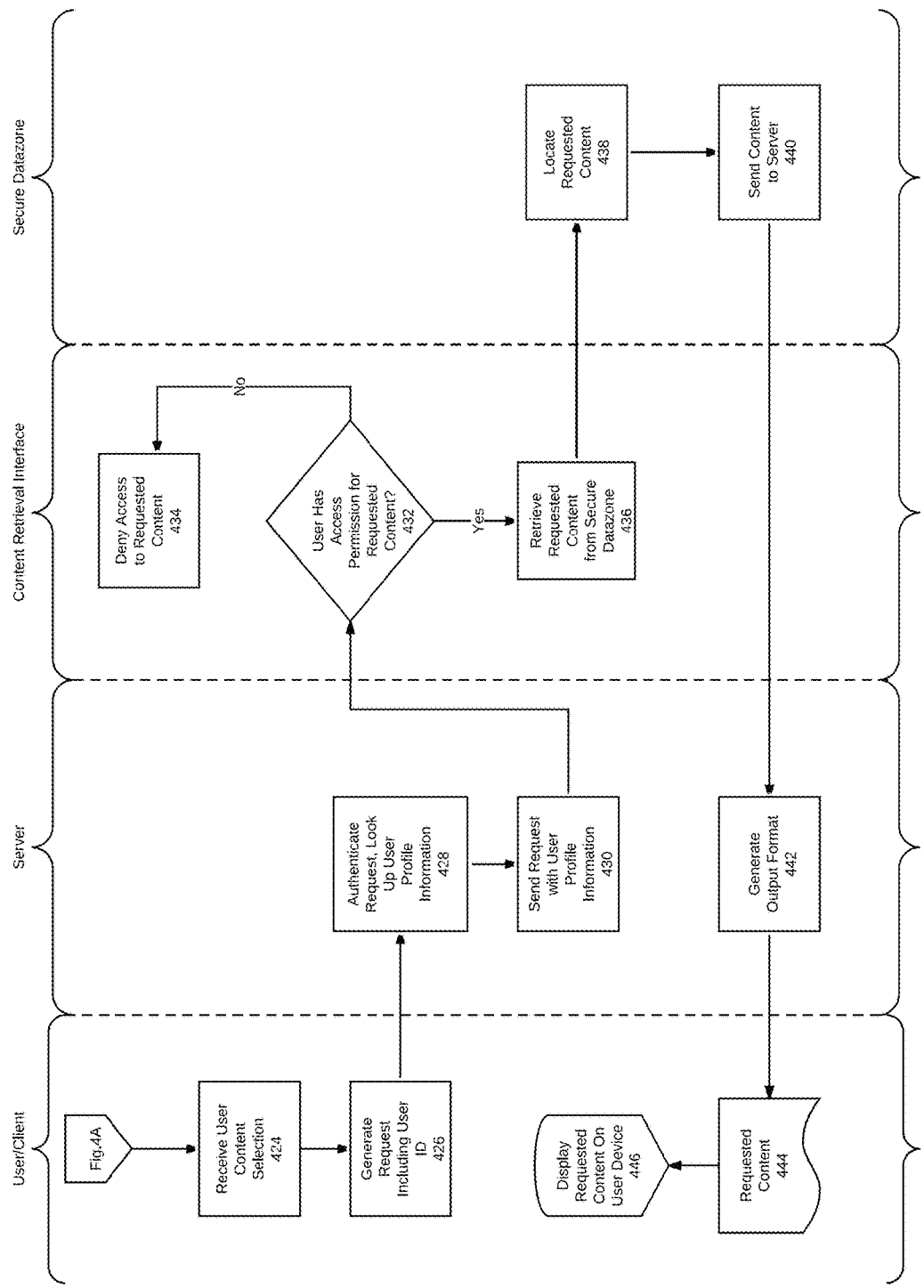

FIGS. 4A and 4B are logic flow diagrams illustrating an example of the process of receiving user ID information and transforming that information into customized content displayed to the user, as performed by the Online Content Manager. As shown, a user/client device interacts with a server, a query interface, and a content retrieval interface, and a search engine to display customized content links to the user device and to retrieve the content associated with those links from a secure datazone. The secure datazone may be one or more databases housing restricted content that may only be accessed by authorized users.

At 400 in FIG. 4A, the user enters user ID information. User ID information may be a user name and password, a biometric identifier, a secure token, a combination of these, or any other type of information that may be used to uniquely identify the user. At 402, the user device generates a request to the server based on the user ID information submitted by the user. At 404, the server authenticates the request. For example, the server may pull a user profile from a user database to determine the permission level granted to the user. The user profile retrieved by the server may also include additional information about the user that will be helpful in constructing an appropriate query. In one exemplary embodiment, a set of parameters are included in the request.

At 406, the server sends the authenticated user profile information to a query interface. The query interface constructs a query based on the user profile, without any additional information being provided by the user. The user does not need to enter search terms, click a link, or take any other action. Once the query has been constructed, the query is sent to a search engine, as shown at 408.

At 410, the query is then run against the search engine, which produces results that are sent back to the server at 412. In one exemplary embodiment, the search engine produces results in XML format. At 414, the server receives the search results. Once the results have been received, the server then trims the results based on the user's security profile, as shown at 416. Trimming the results means removing content returned by the search engine that the user does not have permission to access. In one exemplary embodiment, access permissions may be determined by comparing the information in a user's profile with the metadata tags assigned to each piece of content that is created within the Online Content Manager, as explained above. Each user profile may include security parameters such as Geography, OrgType, OrgID, Role, and Rank. Each piece of content within the secure datazone will also have security parameters that control access to that piece of content.

Once the search results have been trimmed to remove portions that the user is not authorized to access, the search results may also be prioritized based on targeting attributes, as shown at 418 in FIG. 4A. In one exemplary embodiment, targeting attributes are metadata tags added to each piece of content, either by the user or by the company or organization operating the Online Content Manager. Security metadata tags will allow an author to determine who is allowed to see the piece of content, while targeting metadata tags will allow the author to determine who he or she would like to see the data. For example, one type of content might not be particularly sensitive and so might be open for all users to see. But it may only have relevance to a subset of those users. By adding targeting metadata to the content, the author or the organization can ensure that the content is seen by those users that would find it most useful.

After the search results have gone through security trimming 416 and content targeting 418, the search results are formatted and displayed as links or pointers on the user device, as shown at 420. In one exemplary embodiment, only the links, not the content itself, is displayed to the user. The user must then select a link 422 to request the content that the link points to.

As shown in FIG. 4B, when the user selects a link 424, the user device generates a request 426, which includes the user ID information. This request is then sent to the server. The server then authenticates the request and looks up the user profile information, as shown at 428. At 430, this request with the user profile information is then sent to the content retrieval interface. The user profile information may include security parameters such as Geography, OrgType, OrgID, Role, Rank, and any other suitable parameters. In one exemplary embodiment, as shown at 432 of FIG. 4B, the content retrieval interface compares these security parameters in the user profile with the security metadata associated with the requested content to determine whether the user can access the content. Although the user's security profile may have been checked previously during the security trimming process 416, the content retrieval interface is now double checking to make sure that the user can access the particular piece of content that he or she requested.

At 432, the content retrieval interface determines whether the user has permission to access the requested content. If the security parameters of the user profile do not match the security metadata of the requested content, access to the content is denied at 434. If the security parameters of the user profile do match the security metadata, the content retrieval interface retrieves the requested content from the secure datazone at 436.

The requested content is then located within the secure datazone, 438, and send back to the server, 440. In one exemplary embodiment, the content is streamed to the server from the secure datazone. At 442, the server receives the search results and formats the results such that they can be easily displayed by the user device. The resulting content 444 is then sent to the user device, where it is displayed to the user, as shown at 446.

Figure 5A:
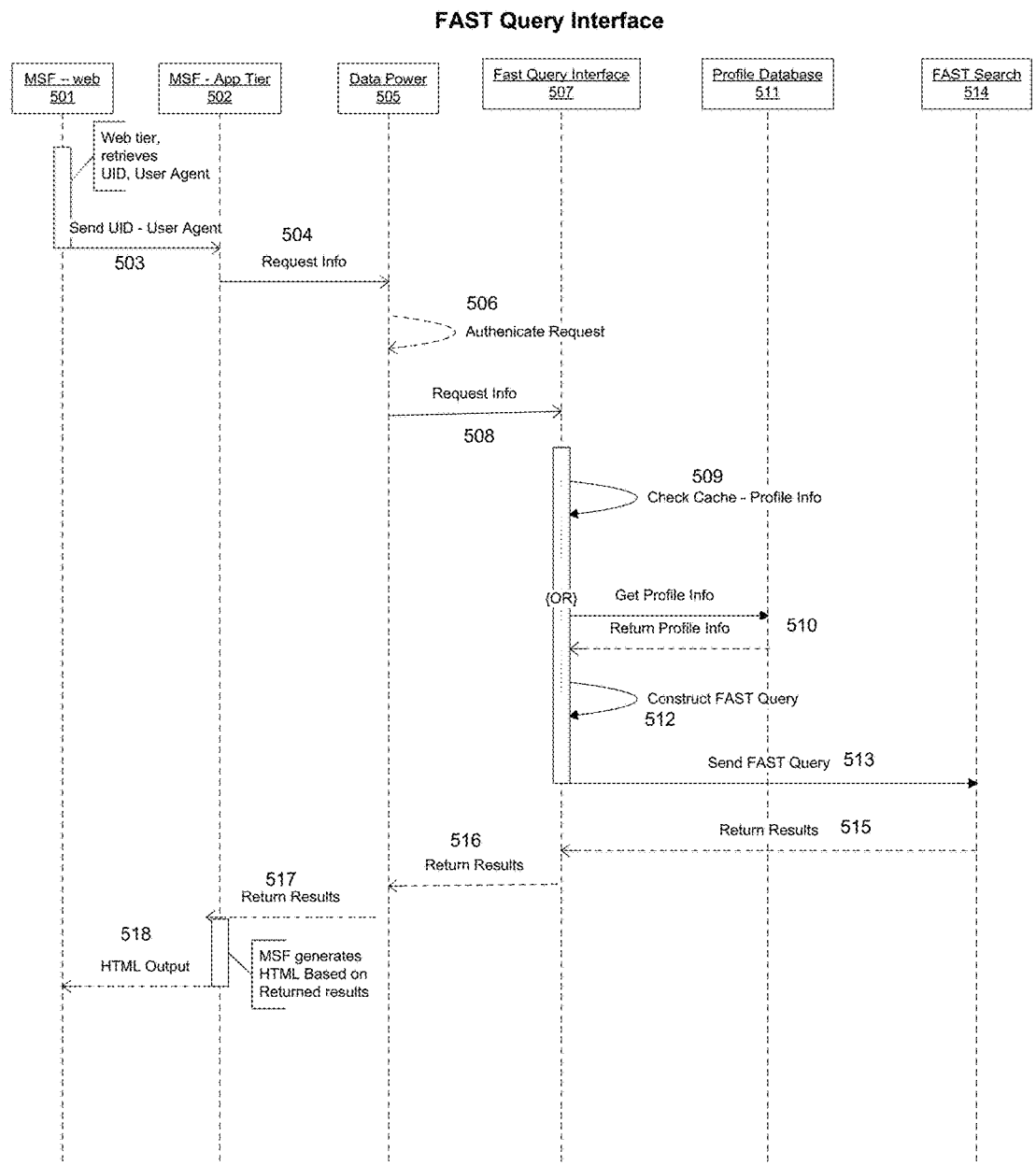
FIGS. 5A through 5E are sequence diagrams illustrating various exemplary embodiments of processes that take may take place during operation of the Online Content Manager.

FIGS. 5A through 5E are sequence diagrams illustrating various exemplary embodiments of processes that take place within the Online Content Manager. FIG. 5A illustrates an exemplary embodiment of a process of requesting information from a query interface. The process begins when a web application 501 retrieves a user ID and user agent information and sends the user agent information and user ID to a collaboration application 502 at 503. At 504, the collaboration application sends a request for information to a data appliance 505. The data appliance authenticates the request 506 and then sends the request to a query interface 507 at 508. The query interface 507 may either check the cache for profile information relating to the user who has requested the info, 509, or retrieve the profile information 510 from a profile database 511.

Once the user profile information has been obtained, the query interface 507 will then construct a query 512 and send the query 513 to a search engine 514. The search engine then runs the query against the content indexed by the search engine and returns the results 515 to the query interface 507, which sends the results 516 to the data appliance 505, which sends the results 517 to the collaboration application 502. The collaboration application generates HTML based on the results 517 and sends the HTML output 518 to the web application 501 for display.

Figure 5B:
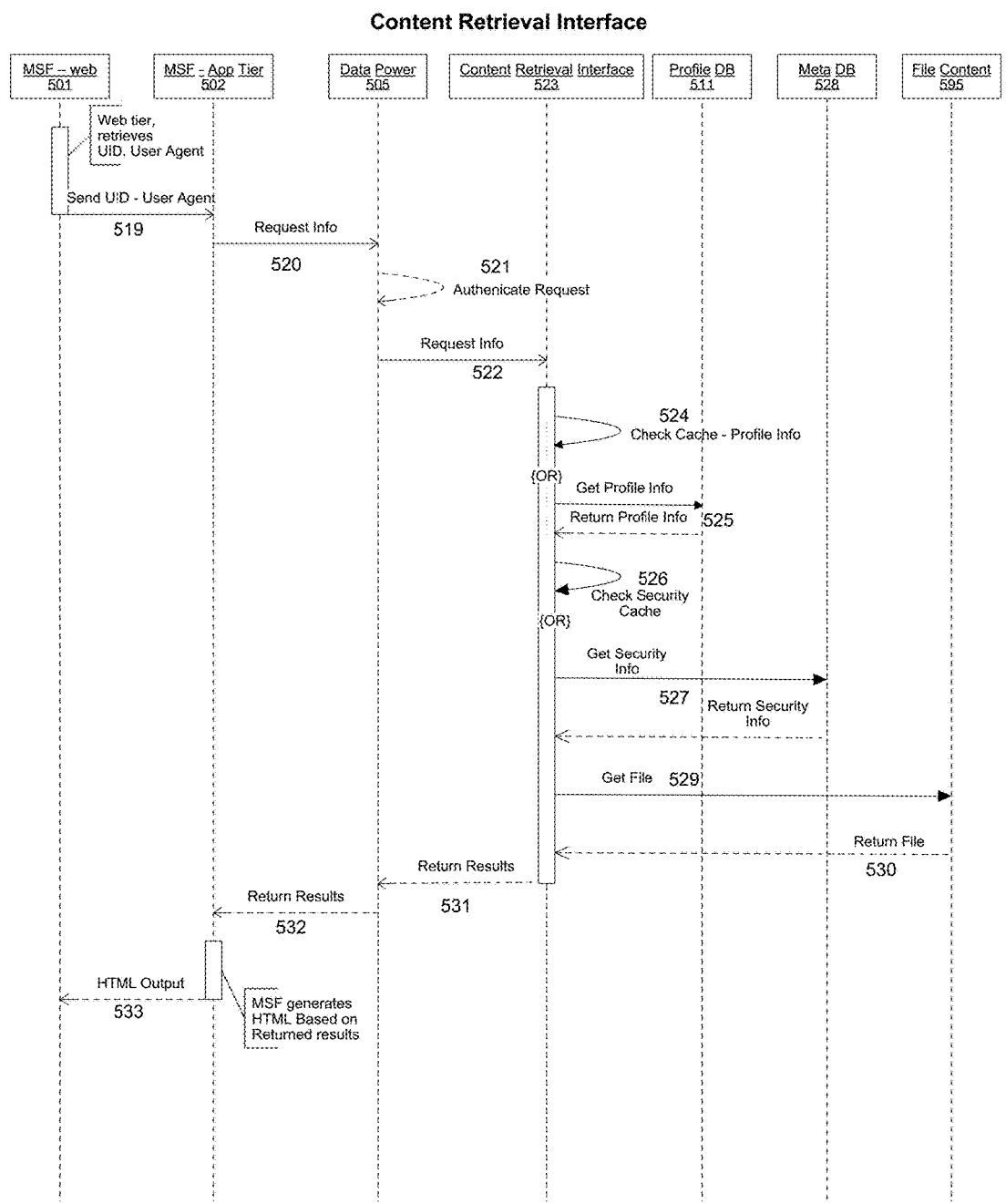

FIG. 5B is an exemplary embodiment of a process for retrieving content from a secure datastore using the content retrieval interface. The process begins with the web application 501 retrieving a user ID and user agent information, which is then sent to collaboration application 502 at 519. The collaboration application 502 then sends a request 520 to the data appliance 505, which authenticates the request 521 and sends the request info 522 to a content retrieval interface 523. The content retrieval interface may obtain profile information about the requesting user by either checking a cache 524 or retrieving the information 525 from the profile database 511. Similarly, the content retrieval interface 523 may obtain security information about the requesting user by either checking a security cache 526, or by retrieving the information 527 from a metadata database 528. Once the content retrieval interface 523 has determined that the requestor has the appropriate permissions, it will then get the requested content 529, from a file server 595, which then returns the content 530 to the content retrieval interface 523. The content retrieval interface 523 sends the results 531 to the data appliance 505, which sends the results 532 to the collaboration application 502. The collaboration application generates HTML based on the results 532 and sends the HTML output 533 to the web application 501 for display.

Figure 5C:
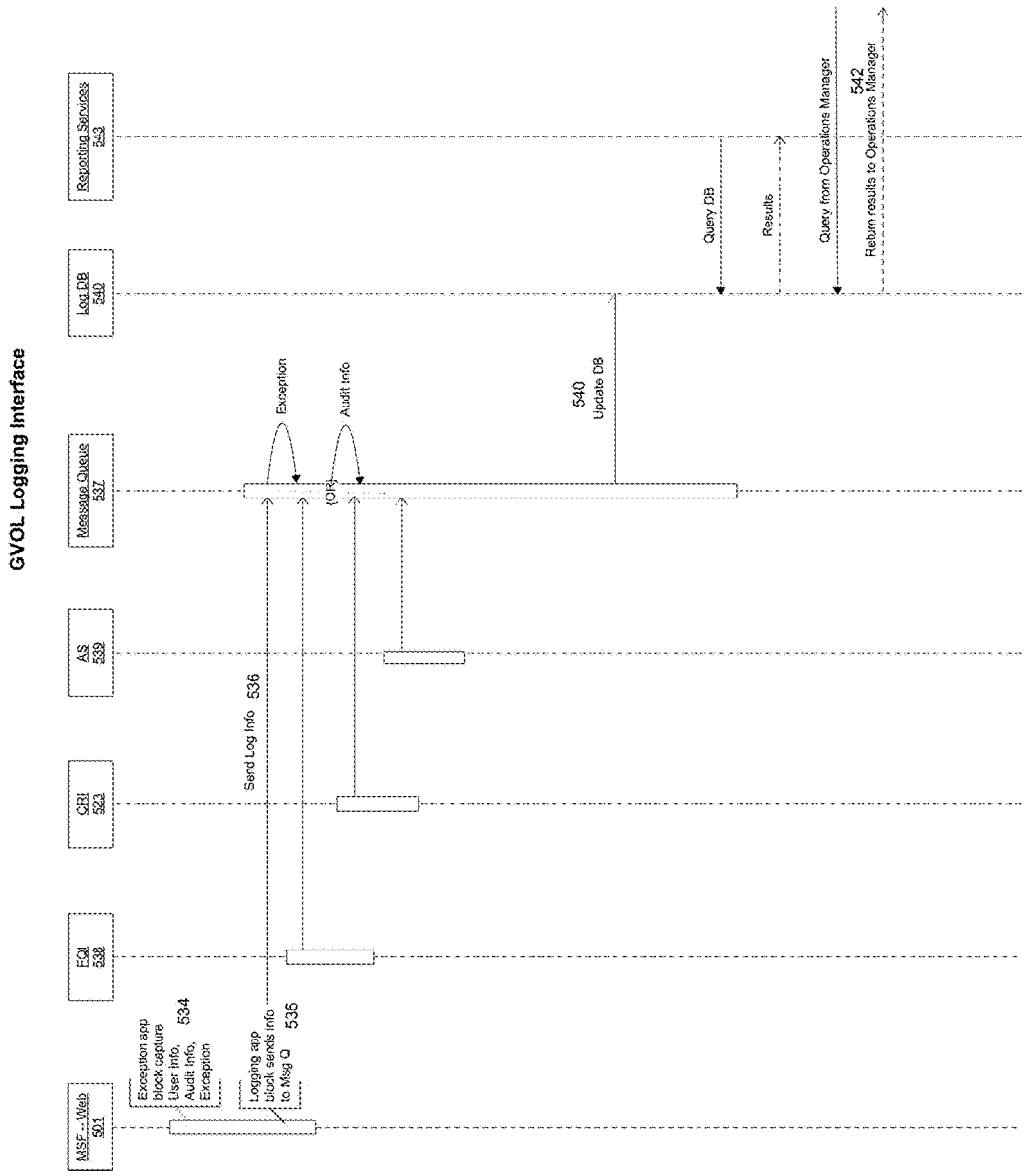

FIG. 5C illustrates an exemplary logging interface capable of handling exceptions and of auditing user access of the Online Content Manager. As shown, web application 501 may include an exception application 534 and a logging application 535. Web application 501 may send log information 536 to a message queue application 537 that captures user information, audit information, and exception information. A query index 538 and an authentication services application 539 may have similar functionality. Message queue application 537 may send periodic updates 540 to log database 541, which can then be queried by an operations manager 542 or by a reporting service 543 to diagnose system failure and to audit system use.

Figure 5D:
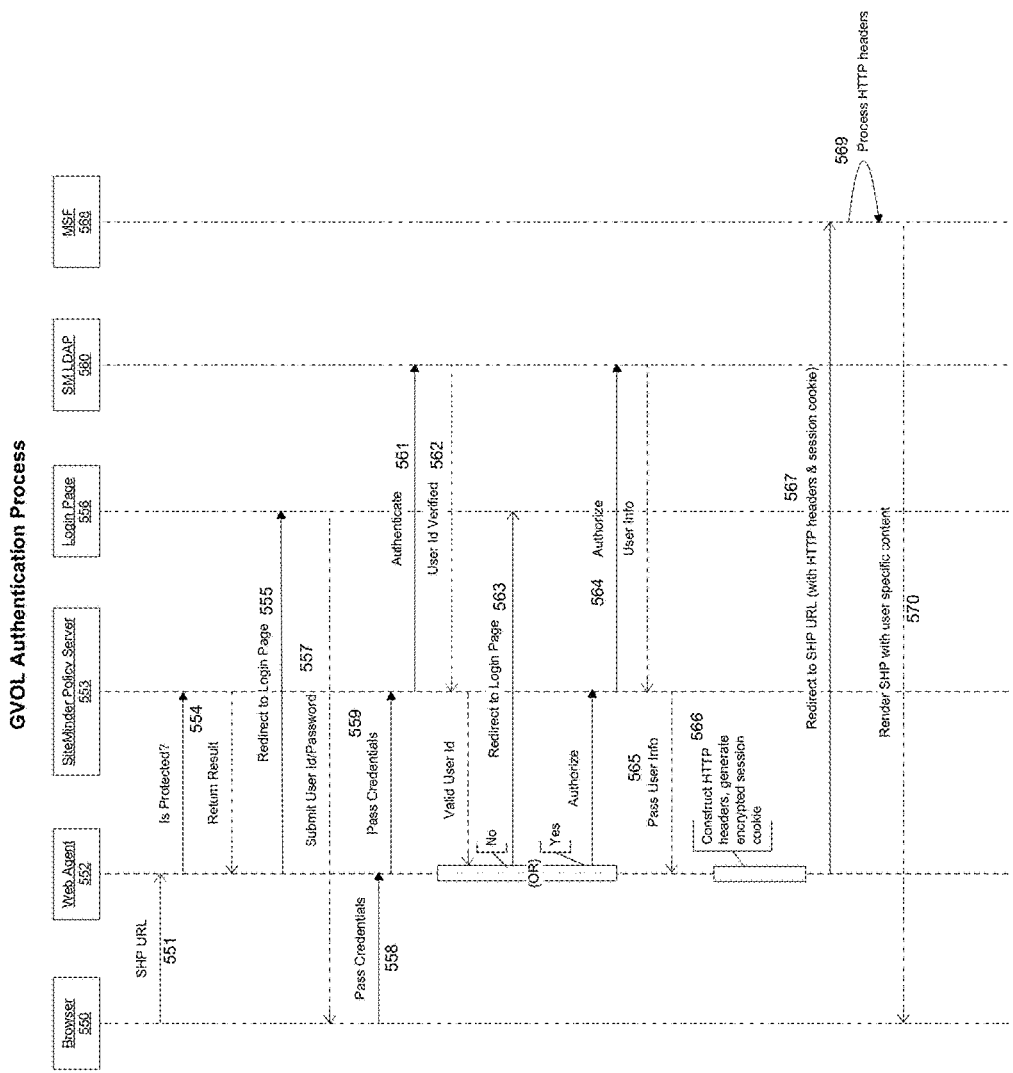

FIG. 5D is an exemplary embodiment of a process for authenticating a user in the Online Content Manager and for allowing the user to access secure content. As shown, a user may use a web browser 550 to send a request 551, in the form of a URL called from a secure home page, to a web agent 552. The web agent 552 then sends the request to a policy server 553, which determines whether the URL is protected 553. If the URL is protected, the user is redirected 555 to a login page 556. The user may then use the web browser 550 to submit a user ID and password 557. The web browser 550 then passes these credentials 558 to the web agent 552, which in turn passes the credentials 559 to the policy server 553. The policy server 553 sends the credentials to an LDAP server 560, which authenticates the credentials 561 and sends a verification message 562 to the policy server 553. If the user id has not been verified, the policy server redirects 563 the user to login page 556. If the user id has been verified, the policy server 553 and the LDAP server provide authorization and pass user information 565 back to the web agent 552. The web agent 552 then constructs HTTP headers and generates an encrypted session cookie 566. The web agent then sends 567 the secure home page URL, with the HTTP headers and session cookie to an application server 568. The application server 568 processes the HTTP headers 569, renders the requested secure home page with user specific content 570, and sends the page to the web browser 550 for display.

Figure 5E:
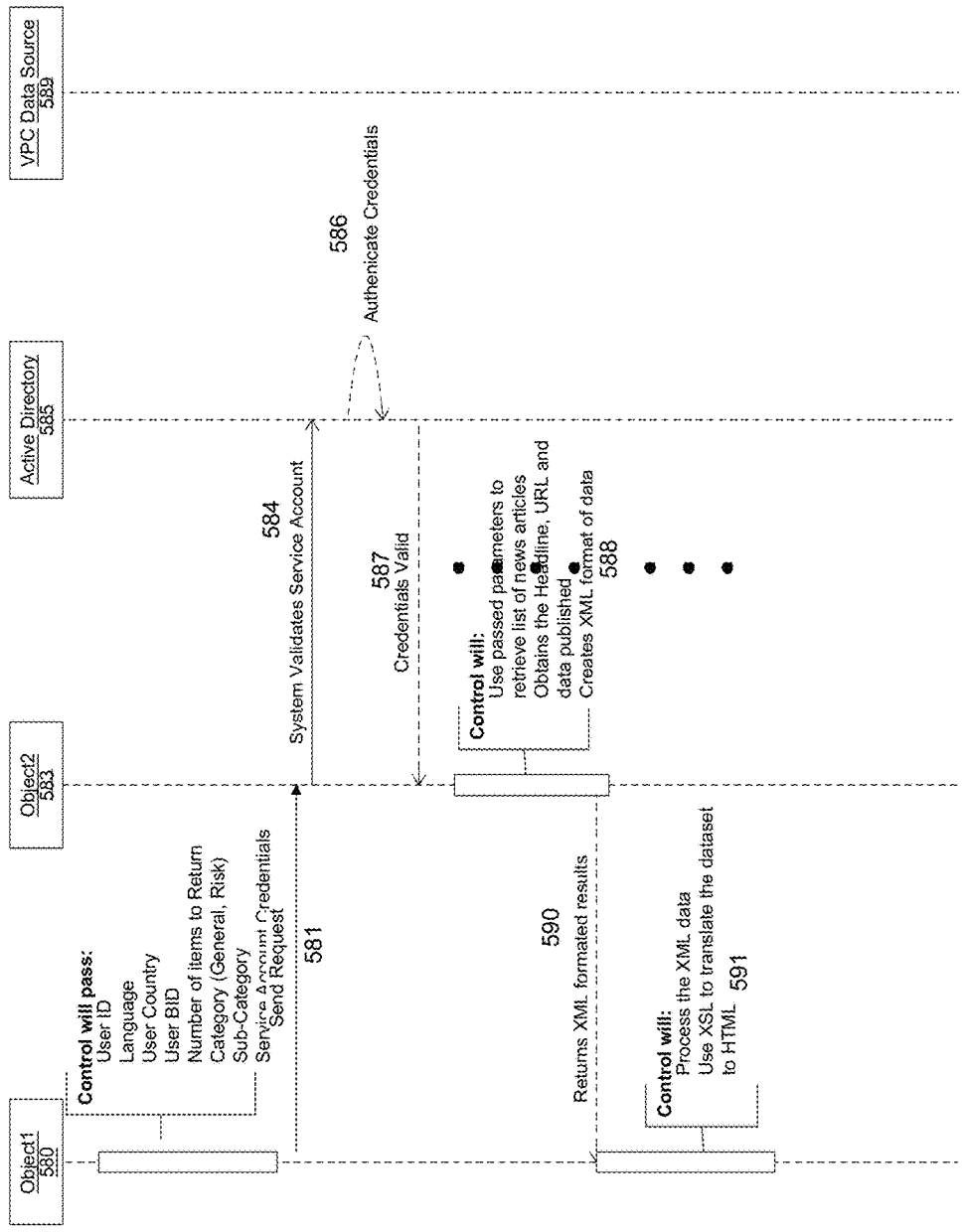

FIG. 5E illustrates an exemplary embodiment of a process for authenticating a user request and providing secure content to the user via a secure web portal or home page. As shown, a custom control interface 580 may pass a plurality of parameters within a request 581 to an object 583. The parameters may include the following, for example: User ID, Language, User Country, User Business ID, Number of items to return, category (general, risk), sub-category, and service account credentials. The object 583 validates the service account 584 by sending the credentials to and active directory 585. Active directory 585 authenticates the credentials 586 and sends a message 587 back to object 583 verifying that the credentials are valid. Object 583 will then use the passed parameters to retrieve a list of news articles, obtain the headline, URL, and date published, and create and XML format of this data, as shown at 588. This data may be obtained from data source 589. Object 583 then returns the XML formatted results 590 to control interface 580, which processes the XML data and uses eXtensible Stylesheet Language (XSL) to translate the dataset to HTML, as shown at 591.

FIG. 6A illustrates one example of a secure home page that may be displayed on a user device by the Online Content Manager. In one embodiment, the secure home page may display a plurality of self-contained modules or web parts. Each module may contain specific content. For example, one module may include public content and another module may include only secure content. Modules may also include content targeted specifically at the user based on the user profile information. In one exemplary embodiment, the modules may contain more than one type of content.

FIG. 6B illustrates another example of a secure home page or web portal as described in this disclosure. As shown, the secure home page may include a module that allows the user to view a list of his or her applications and services, that is, applications and services that the user is entitled to and applications and services that the user is enrolled in. The list may include links that allow the user to access each of the applications or services. This information may be customized for the user based on the user profile, including information about the user's organization type and the role within the organization. In one exemplary embodiment, users may be able to edit and/or sort the list according to their preference. A list of enrolled applications and services may be presented separately from a list of eligible applications and services—applications and services that the user is entitled to access but has not yet enrolled in. This allows a user to quickly see which services and applications he or she may want to enroll in. In one embodiment, the Online Content Manager includes functionality for enrolling in the presented applications and services.

In one exemplary embodiment, the secure home page may include a personal dashboard module. The personal dashboard module may include quick links to a user's favorite services and applications, and may allow the user to manage their favorites, which are then stored in their user profile.

The secure home page may also include a module for notifications and announcements, company communications, and featured content, and popular topics. Each of these modules may be populated using targeting.

Online Content Manager Controller

Figure 7:
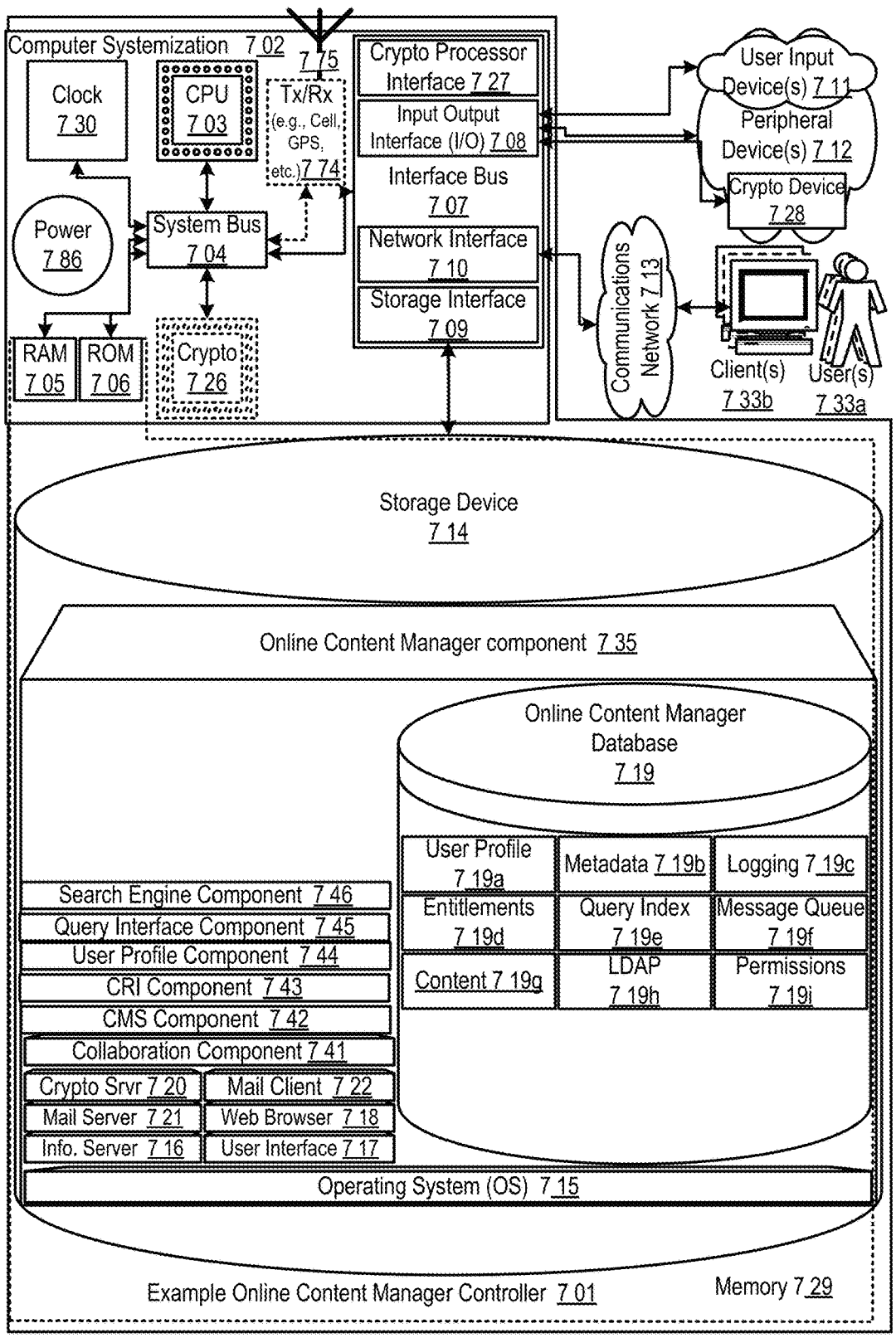
FIG. 7 is of a block diagram illustrating embodiments of an Online Content Manager controller.

FIG. 7 illustrates inventive aspects of a Online Content Manager controller 701 in a block diagram. In this embodiment, the Online Content Manager controller 701 may serve to aggregate, process, store, search, serve, identify, instruct, generate, match, and/or facilitate interactions with a computer through various technologies, and/or other related data.

Users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Online Content Manager controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Online Content Manager controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeable throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effect communications, operations, storage, etc. Optionally, the computer systemization may be connected to an internal power source 786. Optionally, a cryptographic processor 726 may be connected to the system bus. The system clock has a crystal oscillator and generates a base signal through the computer systemization's circuit pathways. The clock is coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Online Content Manager controller and beyond through various interfaces. Should processing requirements dictate a greater amount speed and/or capacity, distributed processors (e.g., Distributed Online Content Manager), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Online Content Manager may be achieved by implementing a microcontroller such as CAST's R8051XC2 microcontroller; Intel's MCS 51 (i.e., 8051 microcontroller); and/or the like. Also, to implement certain features of the Online Content Manager, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Online Content Manager component collection (distributed or otherwise) and/or features may be implemented via the microprocessor and/or via embedded components; e.g., via ASIC, coprocessor, DSP, FPGA, and/or the like. Alternately, some implementations of the Online Content Manager may be implemented with embedded components that are configured and used to achieve a variety of features or signal processing.

Depending on the particular implementation, the embedded components may include software solutions, hardware solutions, and/or some combination of both hardware/software solutions. For example, Online Content Manager features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Online Content Manager features. A hierarchy of programmable interconnects allow logic blocks to be interconnected as needed by the Online Content Manager system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the Online Content Manager may be developed on regular FPGAs and then migrated into a fixed version that more resembles ASIC implementations. Alternate or coordinating implementations may migrate Online Content Manager controller features to a final ASIC instead of or in addition to FPGAs. Depending on the implementation all of the aforementioned embedded components and microprocessors may be considered the "CPU" and/or "processor" for the Online Content Manager.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the Online Content Manager thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the Online Content Manager controller is accessible through remote clients 733*b* (e.g., computers with web browsers) by users 733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Online Content Manager), architectures may similarly be employed to pool, load balance, and/or otherwise increase the communicative bandwidth required by the Online Content Manager controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Online Content Manager controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the Online Content Manager controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the Online Content Manager controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the Online Content Manager component(s) 735, the collaboration component(s) 741, the content management system (CMS) component(s) 742; the content retrieval interface (CRI) component(s) 743, the user profile component(s) 744, the query interface component(s) 745, the search engine component(s) 746 and/or the like (i.e., collectively a component collection). These components may be stored and accessed from the storage devices and/or from storage devices accessible through an interface bus. Although non-conventional program components such as those in the component collection, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the Online Content Manager controller. The operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Online Content Manager controller to communicate with other entities through a communications network 713. Various communication protocols may be used by the Online Content Manager controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Online Content Manager controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Online Content Manager database 719, operating systems, other program components, user interfaces, Web browsers, and/or the like.

Access to the Online Content Manager database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Online Content Manager. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Online Content Manager as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Online Content Manager enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Online Content Manager.

Access to the Online Content Manager mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Online Content Manager may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Online Content Manager component to engage in secure transactions if so desired. The cryptographic component facilitates the secure accessing of resources on the Online Content Manager and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Online Content Manager Database

The Online Content Manager database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Online Content Manager database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Online Content Manager database is implemented as a data-structure, the use of the Online Content Manager database 719 may be integrated into another component such as the Online Content Manager component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719*a-i*. A user profile table 719*a* includes fields such as, but not limited to: a user_id, user_accounts, user_name, mailing_address_street_name, mailing_address_city, mailing_address_state, mailing_address_zip-code, email_address, phone_number, card_number, user_profiles, user_role, user_orgID, user_org_type, user_geography, and/or the like. The user table may support and/or track multiple entity accounts on a Online Content Manager. A Metadata table 719*b* includes fields such as, but not limited to: metadata_id content_country, content_org_type, content_org_id, content_business_line, and/or the like. A Logging table 719*c* includes fields such as, but not limited to: logging_id, access_time, access_location, access_duration, export_notification, email_notification, and/or the like. An Entitlements table 719*d* includes fields such as, but not limited to: entitlements_id, user_role, user_orgID, user_org_type, user_geography, and/or the like. A Query Index table 719*e* includes fields such as, but not limited to: query_index_id, content_country, content_org_type, content_org_id, content_business_line, and/or the like. A Message Queue table 719*f* includes fields such as, but not limited to: message_queue_id, message_name, message_profile, message_length, and/or the like. A Content table 719*g* includes fields such as, but not limited to: content_id, content_type, condent_date_created, content_restrictions, content_line_of_business, content_geography, and/or the like. A LDAP table 719*h* may include fields such as, but not limited to: LDAP_id, LDAP_type, LDAP_profile, and/or the like. A Permissions table 719*i* may include fields such as, but not limited to: permissions_id, content_country, content_org_type, content_org_id, content_business_line, and/or the like.

In one embodiment, the Online Content Manager database may interact with other database systems. For example, employing a distributed database system, queries and data access by search Online Content Manager component may treat the combination of the Online Content Manager database, an integrated data security layer database as a single database entity.

In one embodiment, user programs may contain various user interface primitives, which may serve to update the Online Content Manager. Also, various accounts may require custom database tables depending upon the environments and the types of clients the Online Content Manager may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719*a-i*. The Online Content Manager may be configured to keep track of various settings, inputs, and parameters via database controllers.

The Online Content Manager database may communicate to and/or with other components in a component collection, including itself, and/or facilities of the like. Most frequently, the Online Content Manager database communicates with the Online Content Manager component, other program components, and/or the like. The database may contain, retain, and provide information regarding other nodes and data.

The Online Content Managers

The Online Content Manager component 735 is a stored program component that is executed by a CPU. In one embodiment, the Online Content Manager component incorporates any and/or all combinations of the aspects of the Online Content Manager that was discussed in the previous figures. As such, the Online Content Manager affects accessing, obtaining and the provision of information, services, transactions, and/or the like across various communications networks.

The Online Content Manager transforms user identification information and user selection data inputs via a search engine component, a query interface component, a user profile component, a content retrieval interface component, a content management system component and a collaboration component into a profile data output, a generated query output, search results output, and a secure home page with customized content.

The Online Content Manager component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Online Content Manager server employs a cryptographic server to encrypt and decrypt communications. The Online Content Manager component may communicate to and/or with other components in a component collection, including itself, and/or facilities of the like. Most frequently, the Online Content Manager component communicates with the Online Content Manager database, operating systems, other program components, and/or the like. The Online Content Manager may contain, communicate, generate, obtain, and/or provide program component, system, user, and/or data communications, requests, and/or responses.

Distributed Online Content Managers

The structure and/or operation of any of the Online Content Manager node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Online Content Manager controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c–post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Online Content Manager controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
        $input = "";
        $input = socket_read($client, 1024);
        $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
```

-continued

```
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and improve over previous works, the application is directed to UNIFIED ONLINE CONTENT MANAGER APPARATUSES, METHODS, AND SYSTEMS. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a Online Content Manager individual and/or enterprise user, database configuration and/or relational model, data type, data transmission and/or network framework, syntax structure, and/or the like, various embodiments of the Online Content Manager, may be implemented that enable a great deal of flexibility and customization. For example, aspects of the Online Content Manager may be adapted for processing bill payments. While various embodiments and discussions of the Online Content Manager have been directed to providing access to secure content across disparate data sources, however, it is to be understood that the embodiments described herein may be readily configured and/or customized for a wide variety of other applications and/or implementations.

What is claimed is:

1. A processor-implemented method for securely displaying content through a network, the method comprising:
    indexing disparately owned content via a multi-content owner indexing engine;
    generating a disparately owned content index from the indexing engine;
    receiving, by a first server, a request to access secure content through a network, the request including profile information;
    automatically constructing a query based on the profile information contained in the request rather than based on and without additional input and further without having to provide a structured database query, wherein automatically constructing the query without additional input includes not being required to enter search terms, click a link, or take any other action;
    providing the constructed query to the search engine and running the constructed query against the index;
    trimming the results to remove unauthorized content before placing the results into a multi-source owner template interface, wherein trimming the results includes comparing security attributes in a profile with content security attributes associated with the requested content;
    constructing a display by placing the trimmed results of the query sent from the search engine within the multi-source owner template interface; and
    providing the multi-source owner template interface to a request for display.

2. The method of claim 1, wherein the security attributes include at least one of organization type, organization identifier, business line designation, geographical designation, and role designation.

3. The method of claim 1, further comprising prioritizing the results based on targeting attributes before constructing the display.

4. The method of claim 1, wherein prioritizing the results comprises matching targeting attributes associated with the requested content.

5. The method of claim 1, wherein the targeting attributes include at least one of geography, organization type, organization identity, role, rank, and created date.

6. An online content manager comprising:
    a multi-content owner indexing engine configured to index disparately owned content and to generate a disparately owned content index;
    a first server, configured to receive a request to access secure content through a network, to automatically construct a query based on profile information contained in the request rather than based on and without input, and to output the constructed query and further without having to provide a structured database query, wherein the automatic construct of the query without input includes not being required to enter search terms, click a link, or take any other action;
    a search engine configured to receive the constructed query from the first server, to run the constructed query against the disparately owned content index, and to output the results of the query;
    a constructing module stored in a memory configured to receive the query results from the search engine and to construct a display by placing the results of the query sent from the search engine within a multi-source owner template interface; and
    an output module stored in a memory configured to provide the results in the multi-source owner template interface to a requestor for display;
    wherein the first server is further configured to trim the results received from the search engine to remove unauthorized content before placing the results into the multi-source owner template interface, and
    wherein the results are trimmed by comparing security attributes in a profile with content security attributes associated with the requested content.

7. The method of claim 6, wherein the first server is configured to trim the results by comparing security attributes in a profile with content security attributes associated with the requested content.

8. An online content manager comprising:
    a multi-content owner indexing engine for indexing disparately owned content and generating a disparately owned content index;
    a first server configured to receive profile information from a device;
    a query interface in communication with the first server and configured to automatically construct a query based on the received profile information, rather than based on and without receiving any query input and further without having to provide a structured database query, wherein automatically constructing the query without input includes not being required to enter search terms, click a link, or take any other action; and
    a search engine in communication with both the first server and the query interface and configured to receive the constructed query from the query interface, run the constructed query against the index, and send the results of the constructed query to the first server;
    wherein the first server is configured to send the results to a device for display as links to underlying secure content,
    wherein the first server is further configured to trim the results to remove unauthorized content before sending the results to the device for display, and wherein the results are trimmed by comparing security attributes in a profile with content security attributes associated with the requested content.

9. The online content manager of claim 8, wherein the security attributes include at least one of organization type, organization identifier, business line designation, geographical designation, and role designation.

10. The online content manager of claim 8, wherein the underlying content is housed on a secure second server.

11. The online content manager of claim 8, wherein the underlying content is streamed from the secure second server to the first server.

12. A non-transitory processor-readable tangible medium storing processor-issuable authentication instructions to:
  index disparately owned content via a multi-content owner indexing engine;
  generate a disparately owned content index from the indexing engine;
  receive, by a first server, a request to access secure content through a network, the request including profile information;
  automatically construct a query based on the profile information contained in the request rather than based on and without input and further without having to provide a structured database query, wherein automatically constructing the query without input includes not being required to enter search terms, click a link, or take any other action;
  provide the constructed query to the search engine and running the constructed query against the index; and
  construct a display by placing the results of the query sent from the search engine within a multi-source owner template interface; and
  provide the multi-source owner template interface to a requestor for display;
  wherein the results of the query are trimmed to remove unauthorized content before the results are placed into the multi-course owner template interface, and
  wherein the results are trimmed by comparing security attributes in a profile with content security attributes associated with the requested content.

* * * * *